United States Patent [19]

Soot

[11] 4,025,010

[45] May 24, 1977

[54] RETRACTABLE MOTOR MOUNT

[76] Inventor: Olaf Soot, 9 Tomahawk Lane, Greenwich, Conn. 06830

[22] Filed: May 3, 1976

[21] Appl. No.: 682,530

Related U.S. Application Data

[60] Division of Ser. No. 481,656, June 21, 1974, Pat. No. 3,972,544, which is a continuation-in-part of Ser. No. 394,199, Sept. 4, 1973, abandoned, which is a continuation-in-part of Ser. No. 379,234, July 16, 1973, abandoned.

[52] U.S. Cl. ..................................... 248/4; 115/17; 248/280
[51] Int. Cl.² ................. B63B 17/00; B63H 21/26; F16M 1/02
[58] Field of Search ............. 248/4, 280, 278, 279, 248/281; 115/17, 18 A, 18 E

[56] References Cited

UNITED STATES PATENTS

| | | | |
|---|---|---|---|
| 1,189,754 | 7/1916 | Trenaman | 248/281 |
| 2,131,693 | 9/1938 | Smith | 248/281 X |
| 2,794,410 | 6/1957 | Oliver et al. | 115/18 R X |
| 2,859,929 | 11/1958 | Shontz | 248/4 |
| 3,348,794 | 10/1967 | Hayes | 248/4 |
| 3,417,953 | 12/1968 | Hillquist et al. | 248/280 |
| 3,698,672 | 10/1972 | Gilbert | 248/4 |
| 3,865,335 | 2/1975 | Roller | 248/4 |
| 3,948,472 | 4/1976 | Metcalf | 248/4 |

*Primary Examiner*—J. Franklin Foss

[57] ABSTRACT

A towable amphibious structure of the multisectional folding type including a retractable suspension system and is adaptable for both camping and boating purposes. Such structure comprises a base body section and at least one associated end body section hinged together at their upper corners. Each section also includes longitudinally directed fin members located along the bottom thereof which are detachably interconnected. The base section includes the retractable suspension system and a vertically adjustable roof assembly. Additional features include a longitudinally retractable motor mount assembly, and removable tow bar and bumper assemblies.

7 Claims, 33 Drawing Figures

FIG. IA
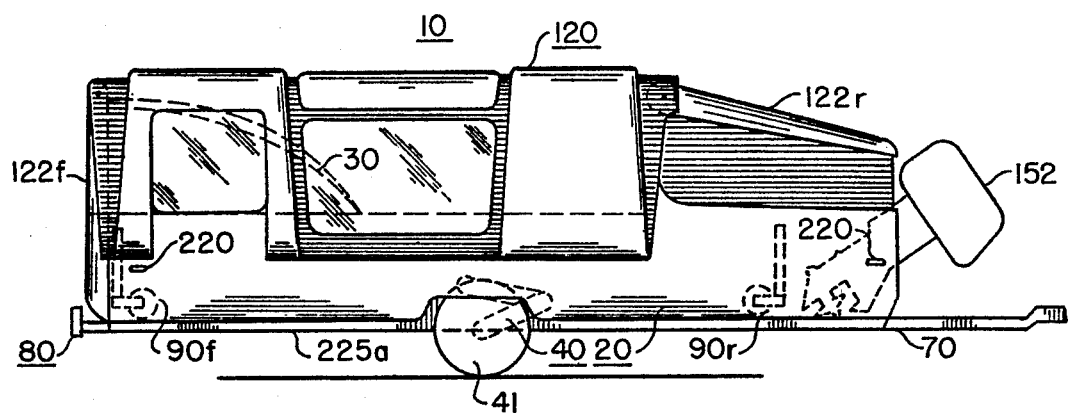
FIG. 2A
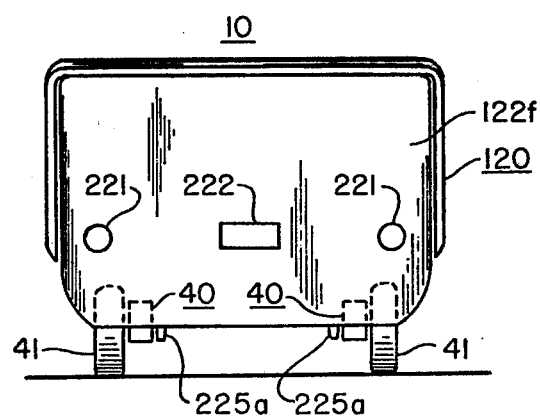

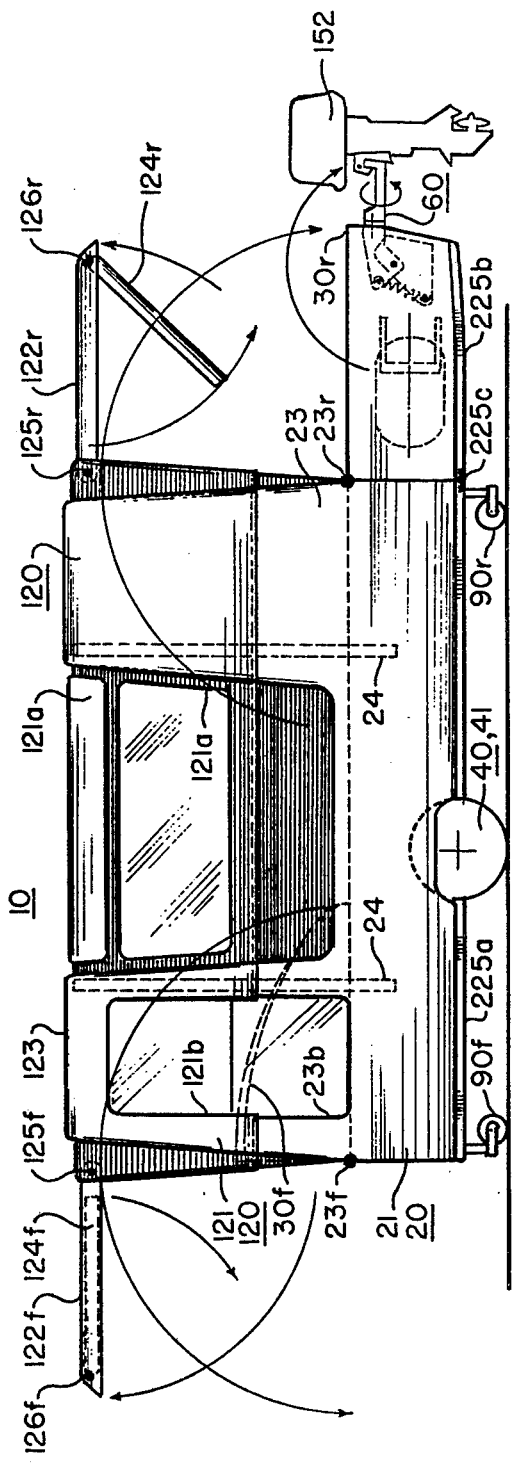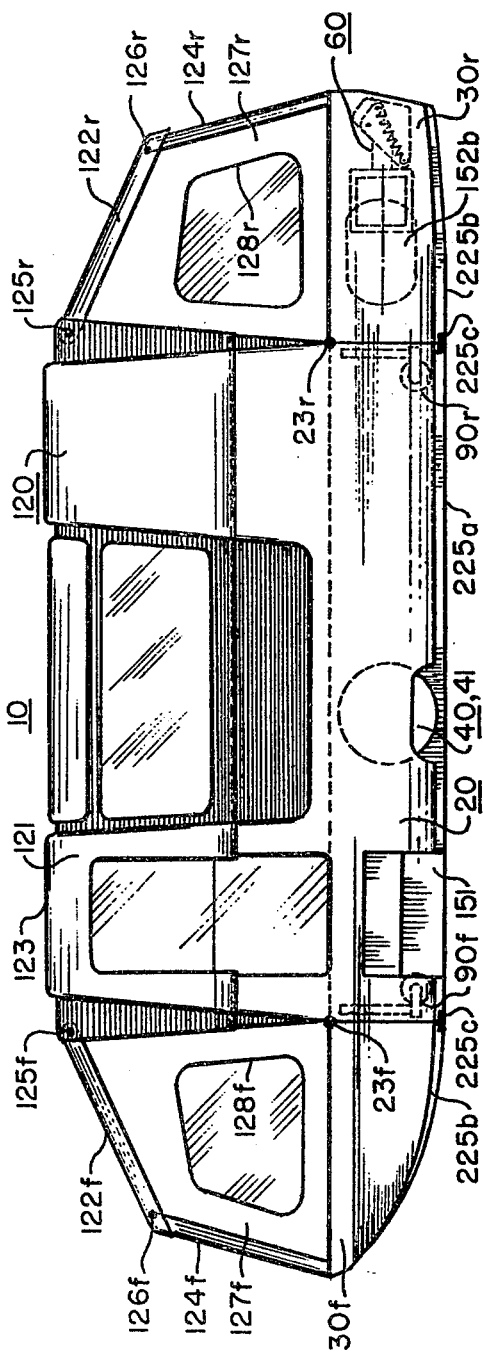

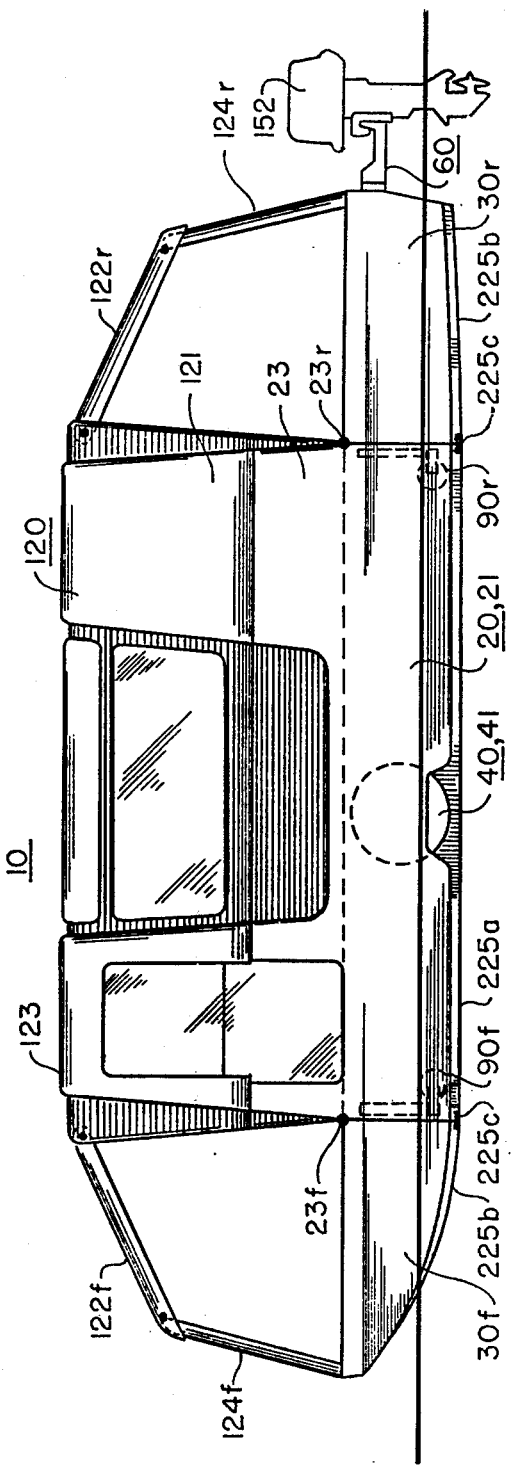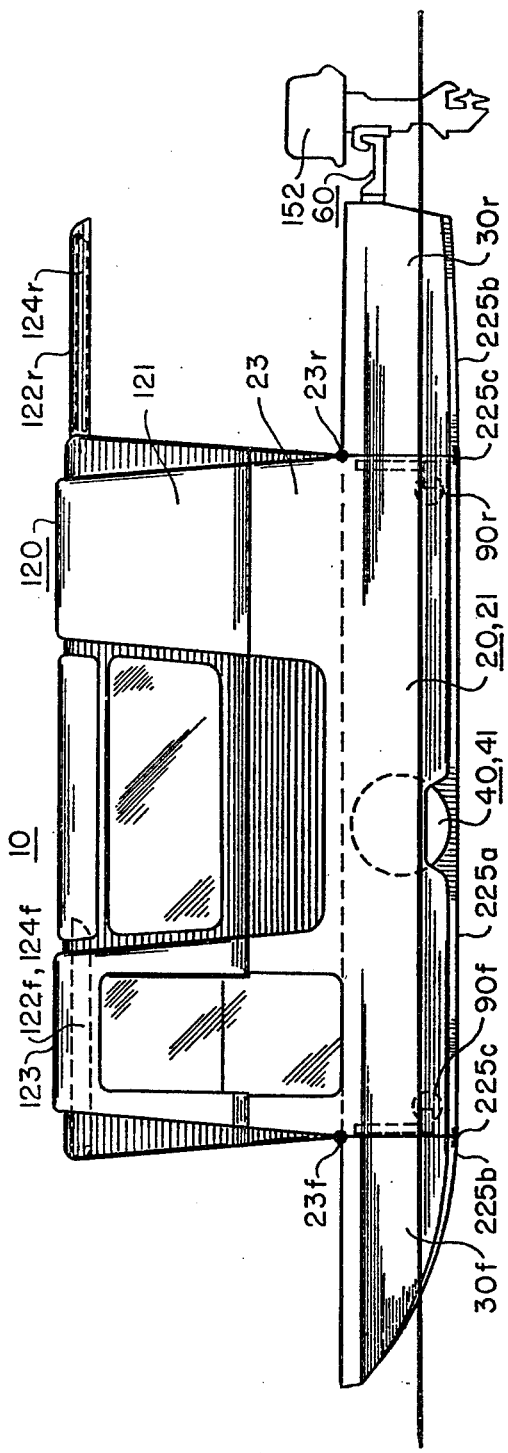

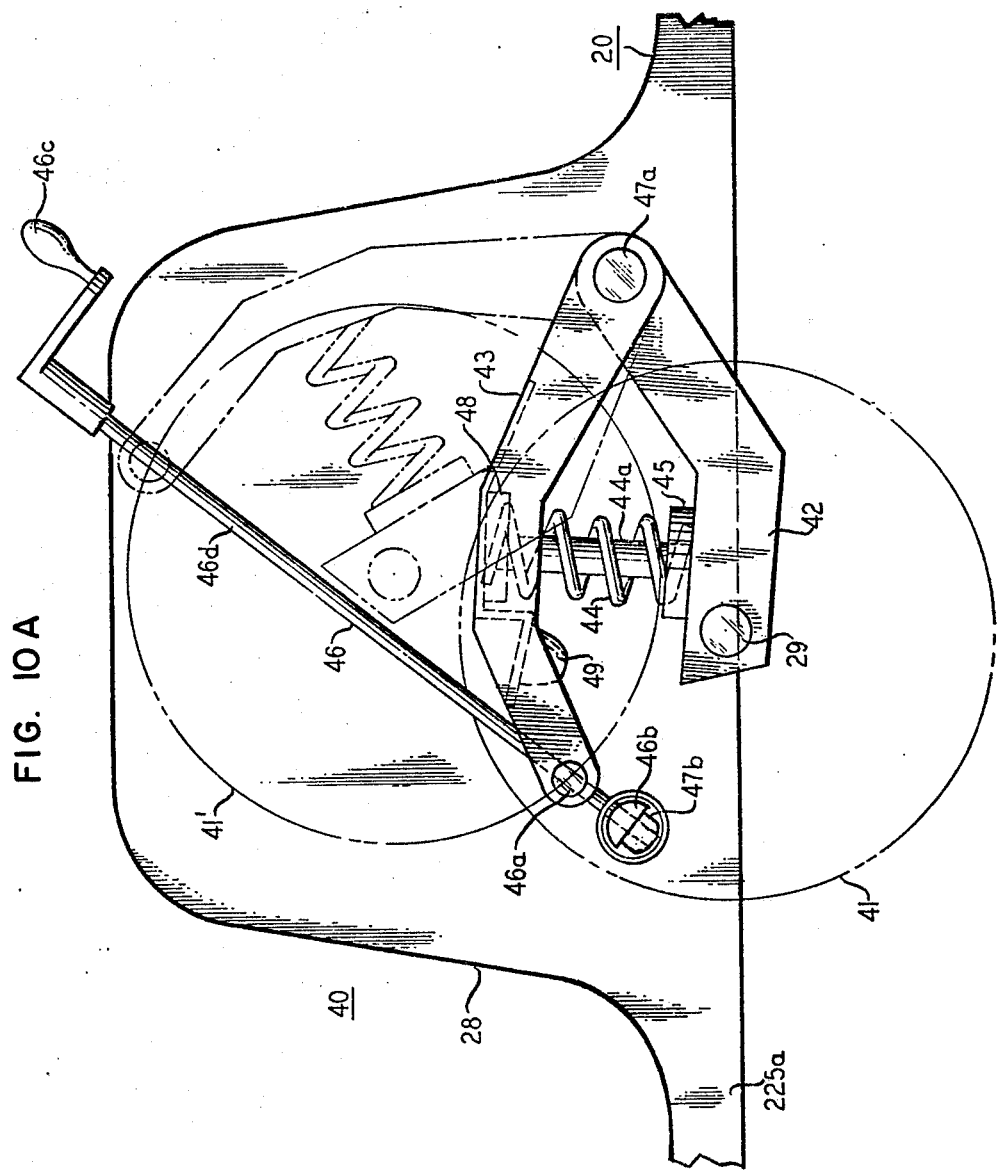

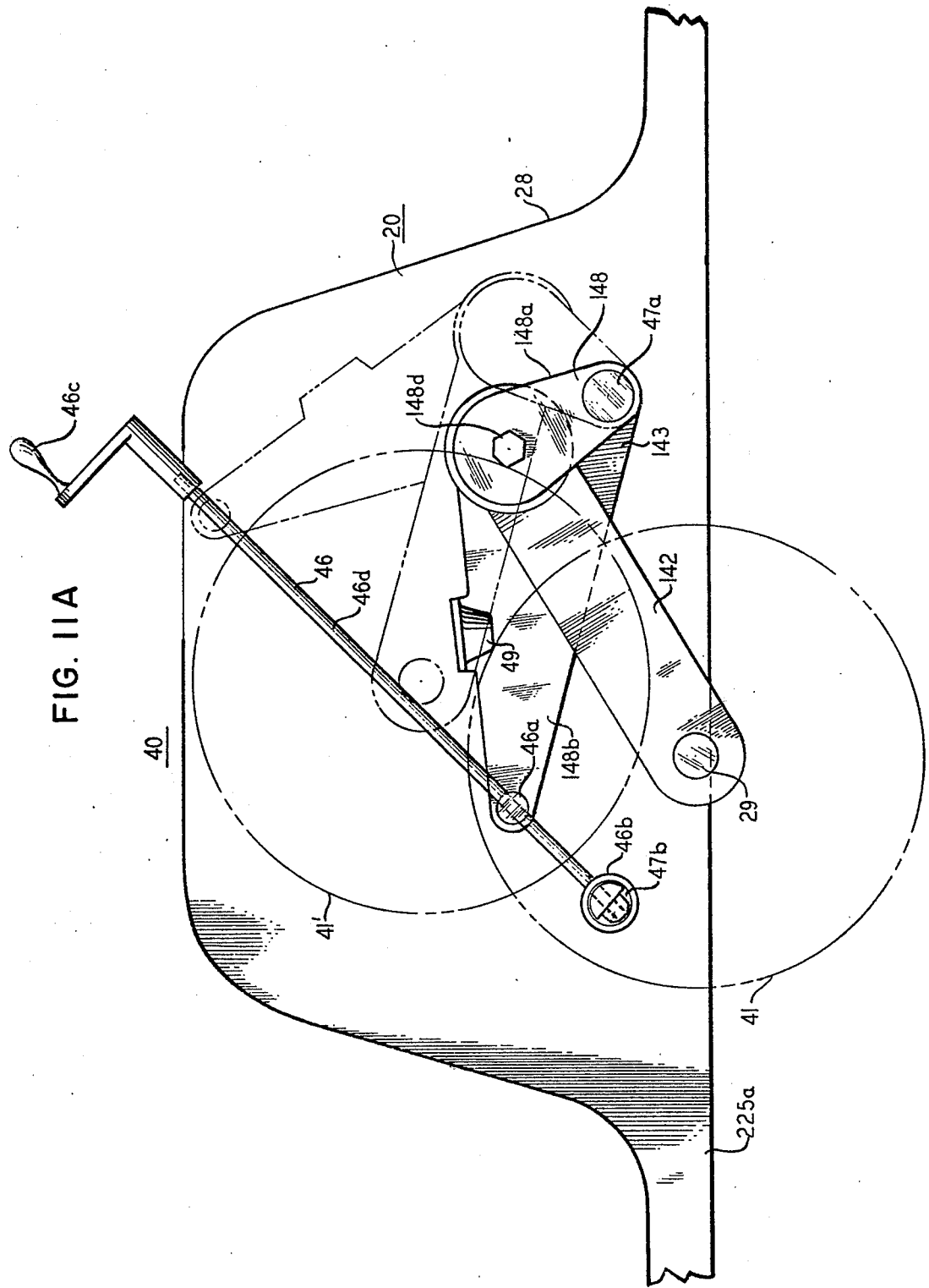

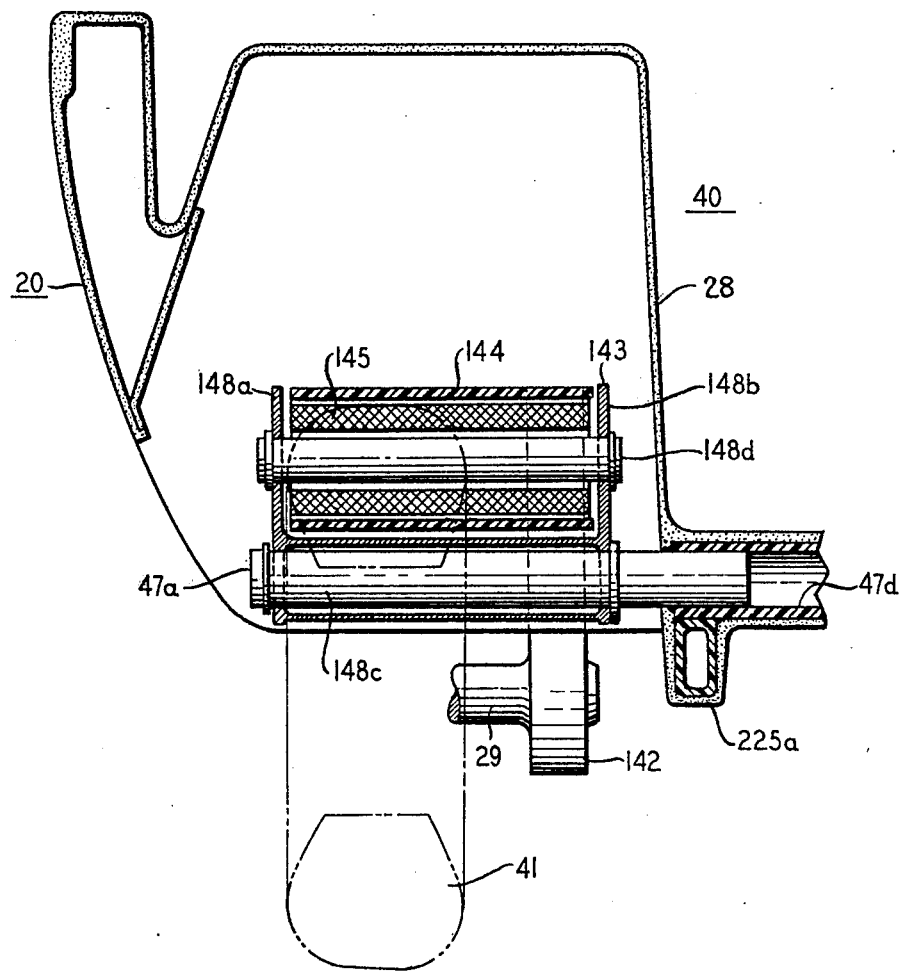

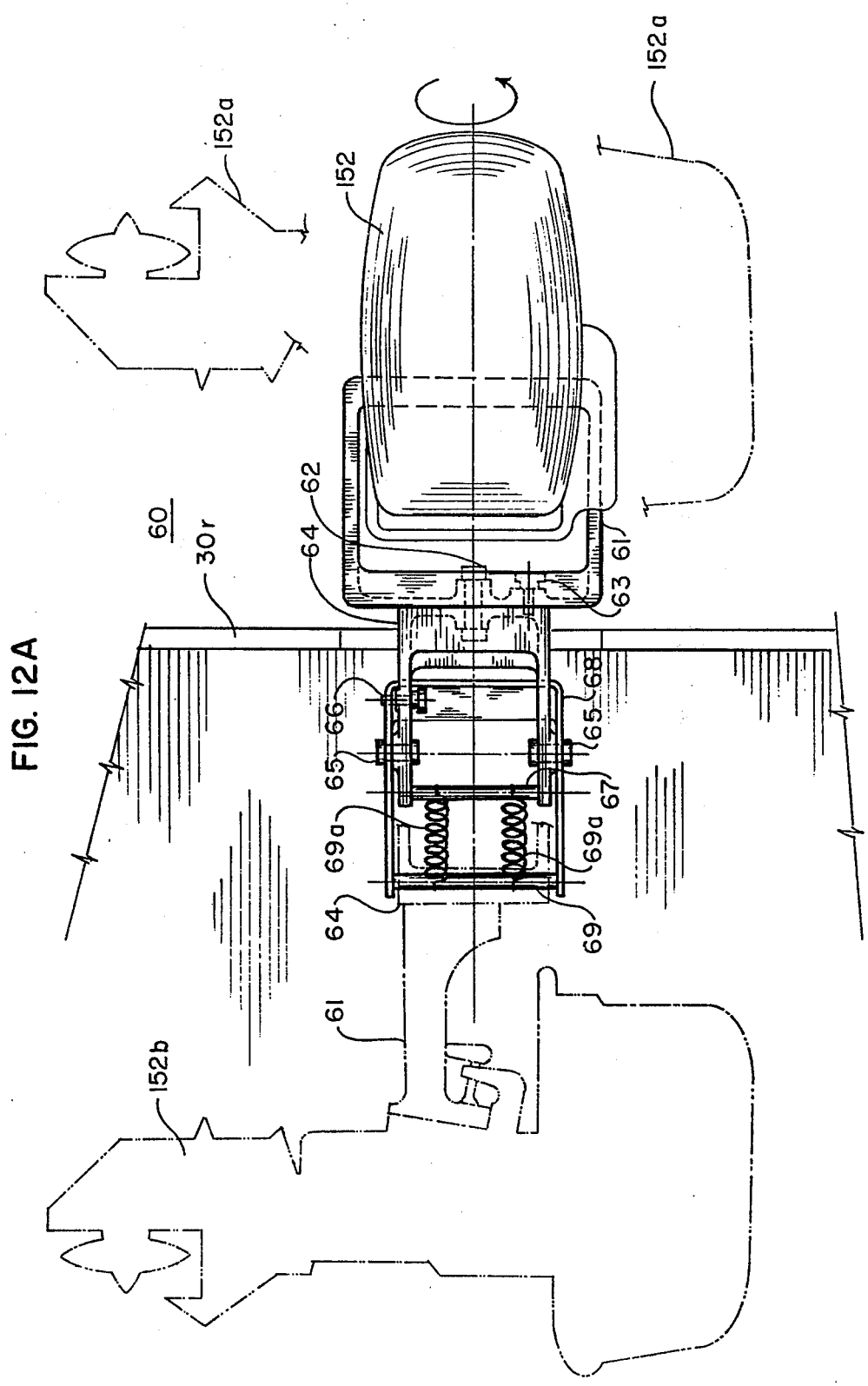

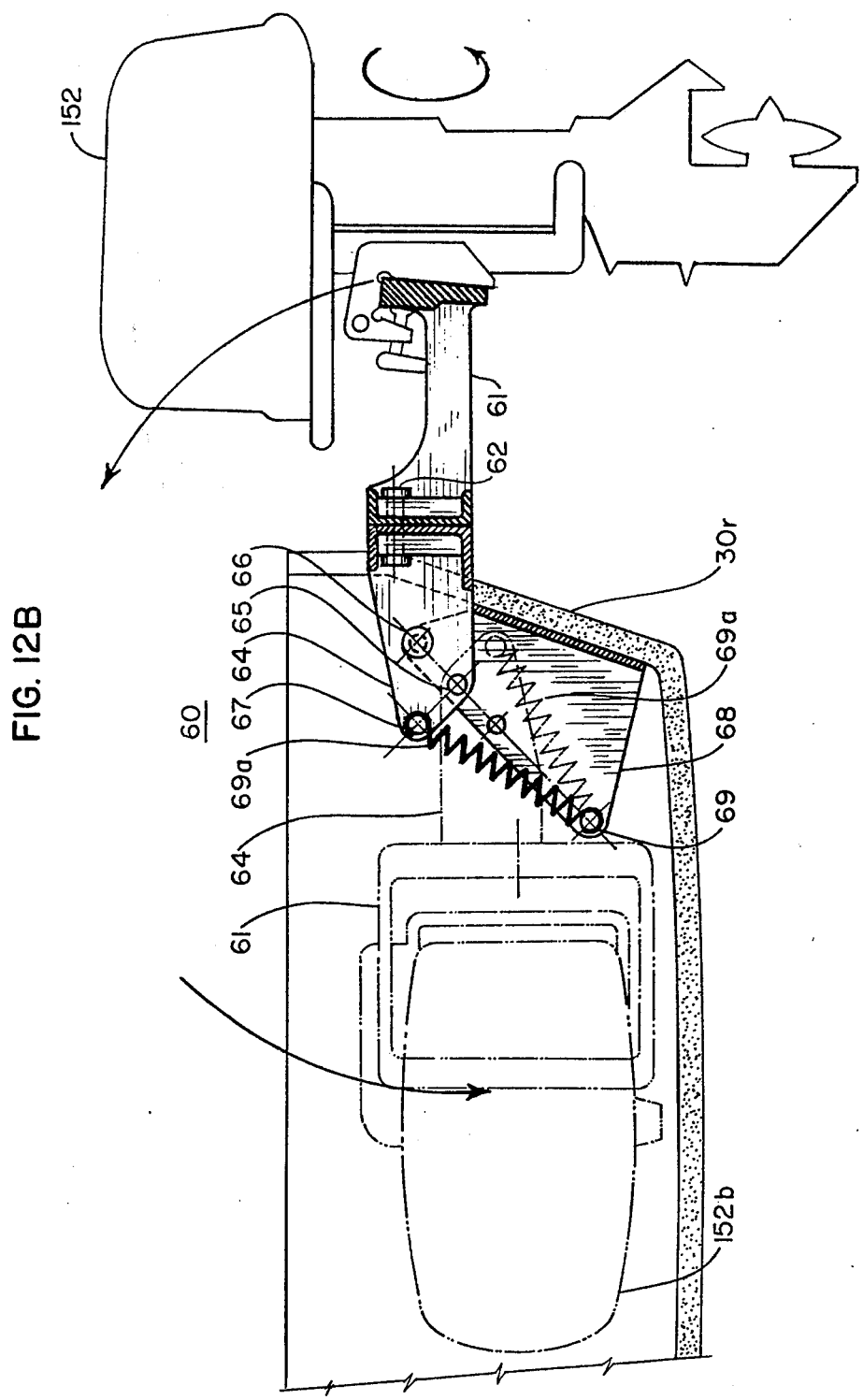

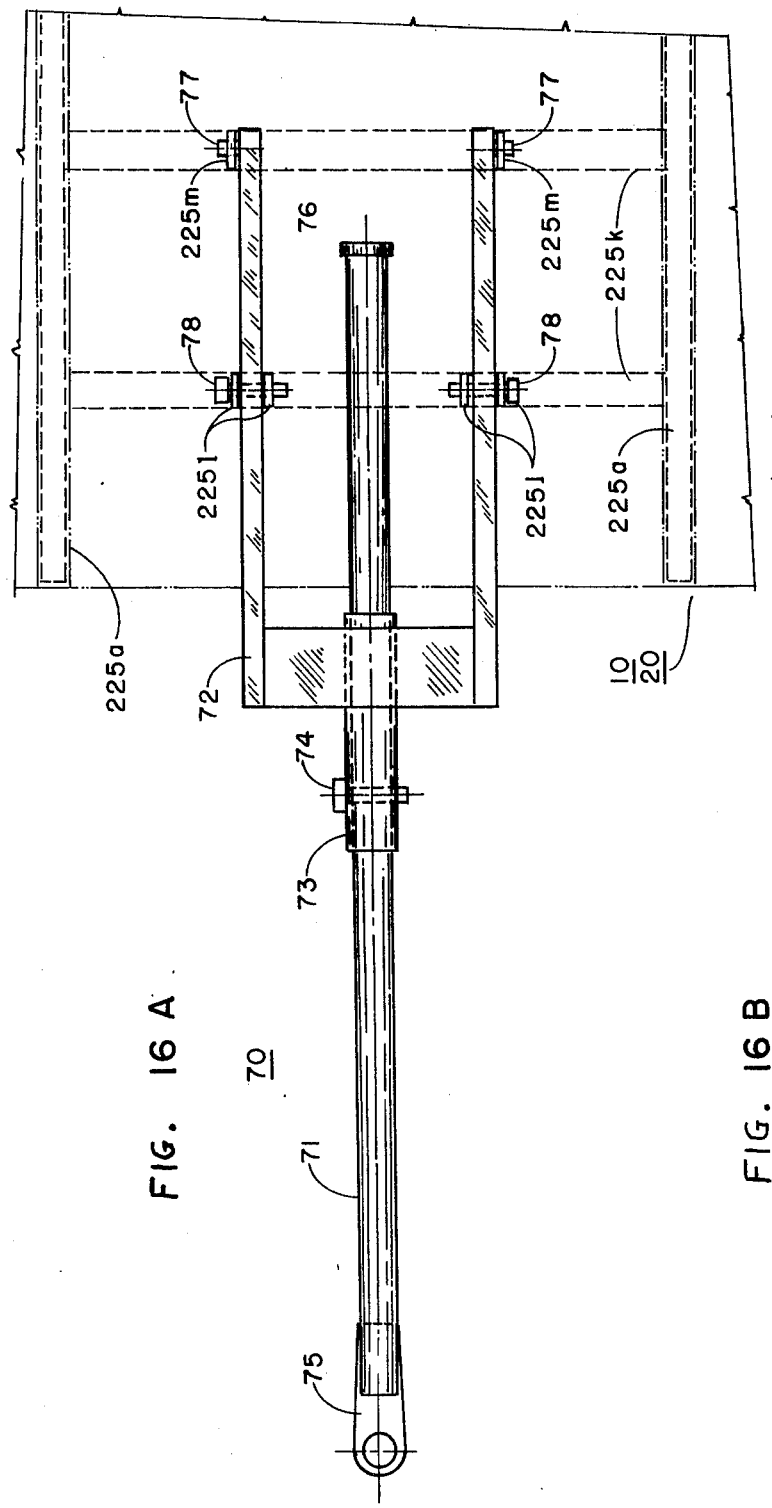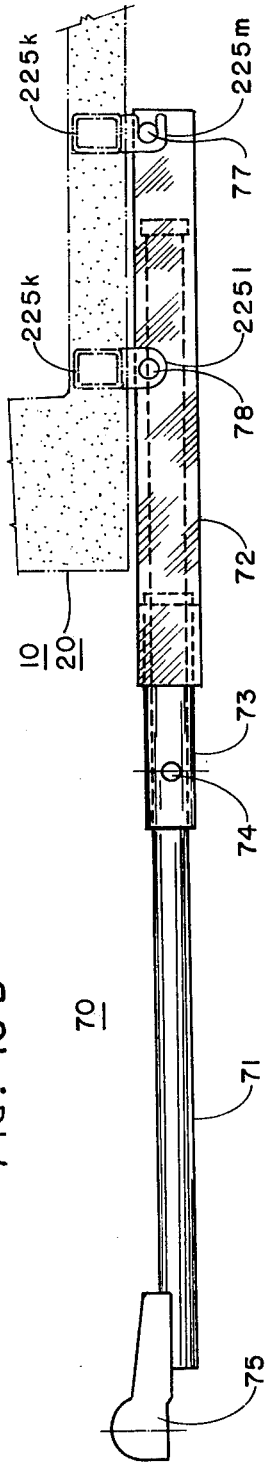
FIG. 16 A.
FIG. 16 B

RETRACTABLE MOTOR MOUNT

This is a division of application Ser. No. 481,656, filed June 21, 1974, now U.S. Pat. No. 3,972,544 which is a continuation-in-part of copending application Ser. No. 394,199, filed Sept. 4, 1973, now abandoned, which, in turn, is a continuation-in-part of copending application, Ser. No. 379,234, filed July 16, 1973, now abandoned. The retractable suspension system is separately claimed in copending application Ser. No. 458,209, now U.S. Pat. No. 3,935,806 filed Apr. 5, 1974, which is also a continuation-in-part of said application Ser. No. 379,234 now abandoned.

FIELD OF THE INVENTION

This invention relates to a towable amphibious structure and, in particular, to such a structure of the multi-sectional folding type including a retractable suspension system.

BACKGROUND OF THE INVENTION

Many recreational vehicles of the prior art can be either towed or used for camping or boating purposes. For example, Olmstead U.S. Pat. No. 67,342; Clemmer U.S. Pat. No. 1,462,800; Gibbs et al U.S. Pat. No. 1,560,983, Olson U.S. Pat. No. 2,287,055; Johnson U.S. Pat. No. 2,339,782; Van oeveren U.S. Pat. No. 2,548,274; and Hastrich (Australian) patent No. 30,181 all disclose multisectional folding boats. These boats, however, neither include a built-in retractable suspension system for transportation nor are they readily suitable or adaptable for camping purposes. Henningsen U.S. Pat. No. 2,460,935 discloses a boat-trailer combination. This combination requires that a crossrod, which secures the wheels during towing of the boat, be removed to allow retraction of such wheels for boating. In addition, this combination is also not suitable for camping purposes since the wheels are not readily adjustable to conform to non-uniform terrain conditions. Finally, Levinson U.S. Pat. No. 3,071,786 discloses a towable boat-camper combination which can be converted from a camper, providing somewhat of an enclosed shelter area, into a boat. However, the structure must remain in the folded configuration for camping purposes, also, no enclosed shelter area is provided during boating.

From the above, it is apparent that no prior art structure provides a unitary multi-sectional structure including a built-in retractable suspension system and which is readily adaptable for both camping and boating purposes. Further, no mention is made of adapting these structures for use on snow or ice such as by replacing the wheels with skis. Another desirable feature of such a structure is that it be readily launchable. Therefore, it would be desirable and advantageous to have one unitary structure which provides substantially all of the above-mentioned features.

Objects of the present invention are therefore to provide:

a unitary towable amphibious structure;

a structure of the multi-sectional type;

a structure of the above type which is readily adaptable for camping purposes;

a structure of the above type which is readily adaptable for boating purposes;

a structure of the above type including a built-in retractable suspension system as an integral part thereof which is fully adjustable to conform to non-uniform terrain conditions.

a structure of the above type which provides a substantial amount of enclosed shelter space during both the camping and boating configurations;

a structure of the above type whose retractable suspension system can be utilized during launching; and a structure of the above type which is readily adaptable for use on snow or ice.

SUMMARY OF THE INVENTION

According to the present invention, a towable amphibious structure, hereinafter referred to as an amphibious camper, substantially comprises an elongated rectangular base body section and at least one associated curved end body section. Each end section is rotatable relative to the base section about a horizontal axis which is perpendicular to the camper's longitudinal direction. Each section is capable of floating independently of any other section. The base section includes a rectangular horizontal floor member, two rectangular vertical ends, and two rectangular vertical sides. Each end section includes a curved floor member, a rectangular vertical end adjacent to the center section, and two side walls. The curved floor member is substantially horizontal at the end which is adjacent to the base section while such floor member is substantially vertical at its other end. The lower edge of each end section's side walls is shaped so as to conform to the contour of the curved floor member. Hinge means, which rotatably connect the upper corners of the base section's vertical ends with the adjacent upper corners of each end section's vertical ends, define the above-mentioned axis. The base section and each end section each include longitudinally directed fin members located along the respective bottoms thereof. The base section further includes a retractable suspension system and a vertically adjustable roof assembly while one section includes a longitudinally retractable motor mount assembly. The relative positions of the base section and each end section, and of their associated components, are varied to provide the towing, camping and boating configurations.

In the towing or folded configuration, each end section is folded over and positioned on top of the base section while the roof assembly and the suspension system are at their respective lowermost positions. Removable tow bar and bumper assemblies are fixedly attached to the opposite ends of the base section.

In both the basic camping and boating or unfolded configurations, each end section is unfolded so as to be coextensive with the base section while the suspension system and the roof assembly are in respective raised positions. Roof panels and associated elements located on the roof assembly cooperate with the extreme ends of each end section and/or the base section to form an enclosed shelter space. Each end section's fin members mechanically interconnect with the base section's fin members to provide an elongated rigid structure. The two bar and bumper assemblies have been removed. In the camping configuration, the suspension system and two adjustable jack assemblies also located on the base section are adjusted so as to level the camper. In the boating configuration, the suspension system is in its fully retracted position while the mount assembly has been rearwardly extended to fix the position of the motor. The relative positions of the roof assembly's components can be varied to provide numerous camping and boating configurations. In addition, the height of the roof assembly can be appropriately adjusted to provide low-profile camping and boating configurations.

The retractable suspension system included in the amphibious camper substantially comprises: a bottom suspension arm having a wheel-axle assembly associated with its first end; a top suspension arm; spring means for interconnecting the arms, a horizontal suspension beam axle fixedly attached to the camper frame; and means attached to the camper frame and substantially to the first end of the top suspension arm for adjusting the rotational orientation of the two arms about the suspension beam axle whose center is coincident with the second ends of the two arms. The unitary camper frame comprises: the horizontal longitudinally directed fin members located along the bottom of the base section; and at least one horizontal laterally directed cross-member, the suspension beam axle being an extension thereof.

According to a first illustrative embodiment, a retractable suspension system substantially comprises a wheel and an associated axle; bottom and top suspension arms; a spring; first and second suspension beam axles; and a jackscrew assembly including a jackscrew, a jackscrew nut, a jackscrew pivot-bearing, and a crank. The wheel is rotatably mounted onto its associated wheel axle, which axle is horizontal and perpendicular to the camper's longitudinal direction. The suspension beam axles are horizontal and perpendicular to the camper's longitudinal direction. These beam axles are fixed relative to the camper frame. The wheel axle is located substantially intermediate the two beam axles. The wheel axle is fixedly attached to the first end of the bottom suspension arm while the first suspension beam axle is rotatably attached to the second end. The bottom suspension arm, which extends along the camper's longitudinal direction and which is substantially horizontal during the towing configuration, is therefore rotatable relative to the first suspension beam axle. The first end of the top suspension arm is also rotatably attached to the first suspension beam axle. In other words, the top suspension arm, which also extends along the camper's longitudinal direction and which is substantially horizontal during the towing configuration, is also rotatable relative to the first suspension beam axle. Now, the jackscrew nut connects the second end of the top suspension arm to an intermediate portion of the jackscrew while the jackscrew pivot-bearing connects the first or lower end of the jackscrew to the second suspension beam axle, as will be hereinafter explained. The crank is fixedly attached to the second or upper end of the jackscrew. The second end of the top suspension arm is substantially adjacent the first end of the jackscrew during the towing configuration. The two beam axles are part of an internal frame which supports the camper. The ends of the beam axles extend to the sides of the camper. The first or lower end of the spring is fixed attached to the first end of the bottom suspension arm while the second or upper end of the spring is fixedly attached to an intermediate portion of the top suspension arm. The spring is substantially vertical during the towing configuration.

The jackscrew nut allows for rotation of the jackscrew about its own axis and for rotation of the top suspension arm relative to the jackscrew whereby the second end of the top suspension arm rides axially along the jackscrew. The jackscrew pivot-bearing allows for rotation of the jackscrew about its own axis and for rotation of the jackscrew's first end about the second suspension beam axle.

Now, rotation of the jackscrew about its own axis in a first direction causes the second end of the top suspension arm to ride up axially along the jackscrew, thereby rotating the top suspension arm about the first suspension beam axle. This, in turn, causes the spring to pull up the first end of the bottom suspension arm, thereby rotating the bottom suspension arm relative to the first suspension beam axle. This, of course, results in the retraction of the wheel axle and its associated wheel. In the retracted configuration, the bottom and top suspension arms are substantially vertical while the spring is substantially horizontal. Rotation of the jackscrew in the second direction results in the lowering of the wheel.

According to a second illustrative embodiment, a retractable suspension system substantially comprises a wheel and an associated axle; bottom and top suspension arms; a pivot assembly; first and second suspension beam axles; and a jackscrew assembly including a jackscrew, a jackscrew nut, a jackscrew pivot-bearing, and a crank. The wheel, the wheel axle, the first end of the bottom suspension arm, the first and second ends of the top suspension arm, the jackscrew nut, the jackscrew pivot-bearing, the jackscrew, and the crank are substantially related to each other and to the camper frame as before. In this embodiment, the pivot assembly includes a U-shaped member and a cylindrical torsional elastomer spring assembly. The U-shaped member has first and second vertically extending portions and an interconnecting hollow lower portion. The elastomer spring assembly further includes a laterally directed central shaft, a hollow cylindrical elastomer member fixedly attached to the central shaft, and a thin cylindrical outer sleeve fixedly attached to the elastomer member. The ends of the inner central shaft are fixedly attached to the extending portions. The first suspension beam axle fits into the lower hollow portion of the U-shaped member and is rotatable with respect thereto. The second end of the bottom suspension arm is rigidly attached to the outer sleeve while the first end of the top suspension arm is rigidly attached to one of the vertically extending portions. Again, rotation of the jackscrew about its axis in a first direction results in the retraction of the wheel and its associated axle into the wheel well while rotation of the jackscrew in the second direction results in the lowering of the wheel.

Features of the present invention are therefore that:

it is a unitary towable amphibious structure;

it is readily convertible into towing, camping, and boating configurations;

it is of the multi-sectional folding type;

each section is capable of floating independently of any other section;

the base section includes a vertically adjustable roof assembly;

the roof assembly is adjustable to provide low-profile camping and boating configurations;

in the towing configuration the base section is adapted to fixedly receive removable tow bar and bumper assemblies, while in both the camping and boating configurations each end section's fin members mechanically interconnect with the base section's fin members; and the wheels of the suspension system can be adjustably retracted into the wheel wells of the base section.

Advantages of the present invention are therefore that"

it allows for various camping and boating configurations and allows for a compact towing configuration;

it provides an enclosed shelter space in both the camping and boating configurations;

it is readily and easily convertible into towing, camping, and boating configurations;

there is no need for a separate trailer, camper, and boat structures;

no excessive water drag results during the boating configuration since the wheels are then fully retracted into associated wheel wells;

it includes a compact adjustable retractable suspension system;

the camper can be leveled on non-uniform terrain by appropriately adjusting the positions of the wheels;

the suspension system is also used for launching the camper;

the outboard engine is always protected during the towing configuartion; and the camper is of simple construction and economical to manufacture.

BRIEF DESCRIPTION OF THE DRAWING

Other objects, features, and advantages of the present invention will be better appreciated by consideration of the following detailed description and the drawing in which:

FIG. 5 is a side view of such camper in a configuration intermediate the towing and camping configurations;

FIG. 6 is a side view of such camper in a basic camping configuration;

FIG. 7 is a side view of such camper in a basic boating configuration;

FIG. 8 is a side view of such camper in another basic boating configuration;

FIGS. 1A and 2A are side and end views, respectively, of a second illustrative embodiment of an amphibious camper in the towing configuration according to the present invention;

FIG. 10A is a side view of a first illustrative embodimention of the camper's retractable suspension system according to the present invention; while FIGS. 10B and 10C are end partially cross-sectional views through the suspension system's first and second suspension beam axles, respectively;

FIG. 11A is a side view of a second illustrative embodiment of the camper's retractable suspension system according to the present invention, while FIG. 11B is an end partially cross-sectional view through the suspension system's front suspension beam axle; and FIGS. 12A and 12B are top and side views, respectively, of a motor mount assembly according to the present invention illustrating the associated motor's various positions;

FIG. 13A is an end cross-sectional view of the base section illustrative of means for adjusting the vertical position of the roof assembly, while

FIG. 15A is a side view illustrative of the operation of means for rotating the end sections relative to the base section, while FIG. 15B is a partially cross-sectional perspective view of such end section rotating means; and FIGS. 16A and 16B are top and side views, respectively, of means for fixedly attaching the tow bar assembly to the base section's fin members.

DETAILED DESCRIPTION

FIGS. 1 through 9 describe a first illustrative embodiment of an amphibious camper according to the present invention.

Figure 1:
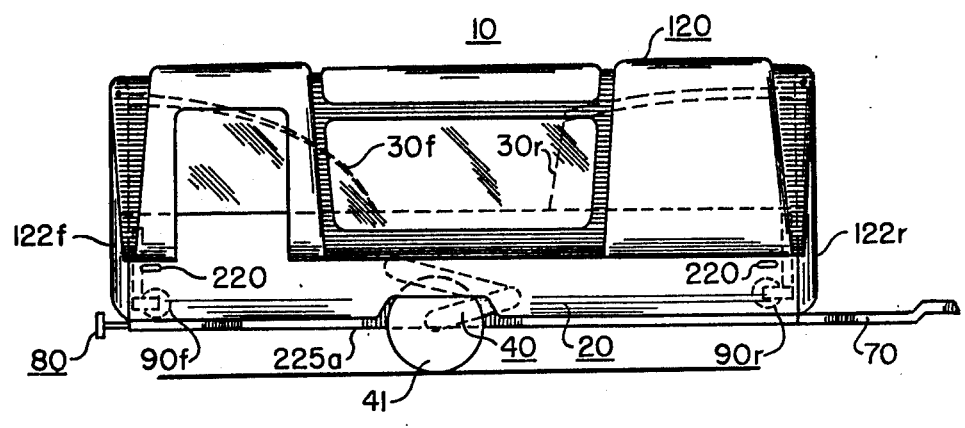
FIGS. 1 and 2 are side and end views, respectively, of an amphibious camper in the towing configuration according to present invention.
Figure 2:
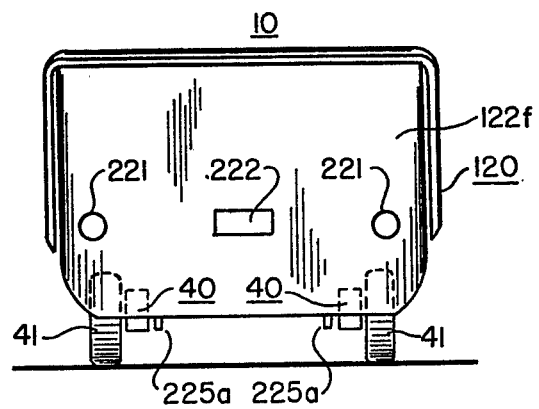
Figure 3:
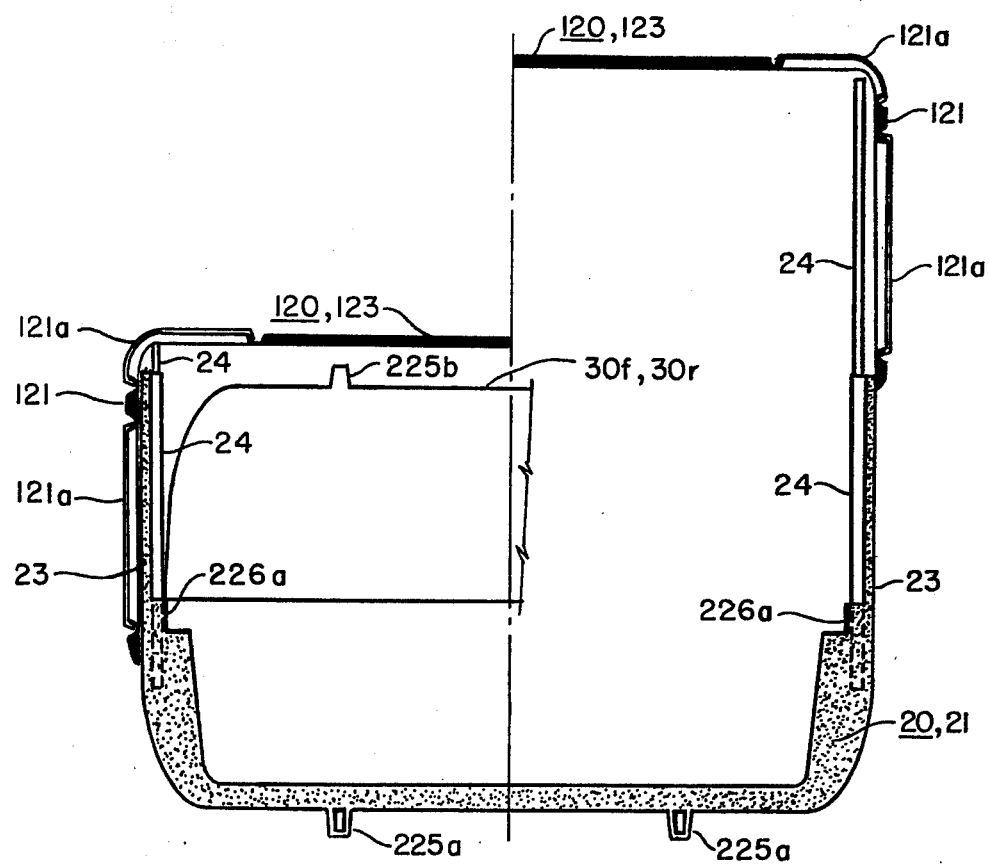
FIG. 3 is an end cross-sectional view of such camper's base section.

In particular, FIGS. 1 and 2 are side and end views, respectively, of a towable amphibious structure in the towing configuration according to the present invention while FIG. 3 is an end cross-sectional view of the structure's roof assembly and base section. The structure, hereinafter, referred to as amphibious camper 10, substantially, comprises base section 20 and front and rear end sections 30f and 30r, respectively. The length of each end section is somewhat less than half the overall length of the base section. Base section 20 further comprises retractable suspension system 40; tow bar assembly 70; bumper assembly 80; front and rear jack assemblies 90f and 90r, respectively; roof assembly 120; and bottom fin members 225a. End section 30f and 30r further comprise bottom fin members 225b, as seen in FIG. 3. Jack assemblies 90f and 90r roof assembly 120 are vertically adjustable as will be hereinafter explained.

Associated with suspension system 40 are wheels 41, which substantially support camper 10 in the towing configuration. Roof assembly 120 includes front and rear end panels 122f and 122r, respectively, which panels are vertically directed in this towing configuration and which are rotatably attached onto assembly 120 as will be hereinafter explained.

Attached to the sides of base section 20 are marker lights or reflectiors 220 while attached to one end roof panel 122r are combination tail-directional lights 221 and combination license plate-light 222.

The front end of camper 10 is defined as the front end during the boating configuration. This, of course, does not necessarily define the front end during the towing configuration.

The front-rear direction of base section 20 defines the camper's longitudinal direction. In light thereof, end sections 30f and 30r; panels 122f and 122r; and wheels 41 are rotatable about respective horizontal axes which are perpendicular to such longitudinal direction. In addition, fin members 225a of base section 20 and fin members 225b of end sections 30f and 30r are directed along such longitudinal direction.

According to the present invention, in this towing configuration, end sections 30f and 30r are folded over and positioned onto base section 20; wheels 41 of suspension system 40 and roof assembly 120 are in their respective lowermost positions; tow bar and bumper assemblies 70 and 80 are fixedly connected to the front and rear ends of base section 20, respectively; jack assemblies 90f and 90r are in their respective uppermost positions; and panels 122f and 122r are vertically oriented. Camper 10, of course, is towed via assembly 70 by an auto or other self-propelled vehicle, not shown. In this configuration, camper 10 can be adapted for towing on snow or ice by snowmobile or other similar machine simply by replacing wheels 41 with skis, not shown.

Figure 4:
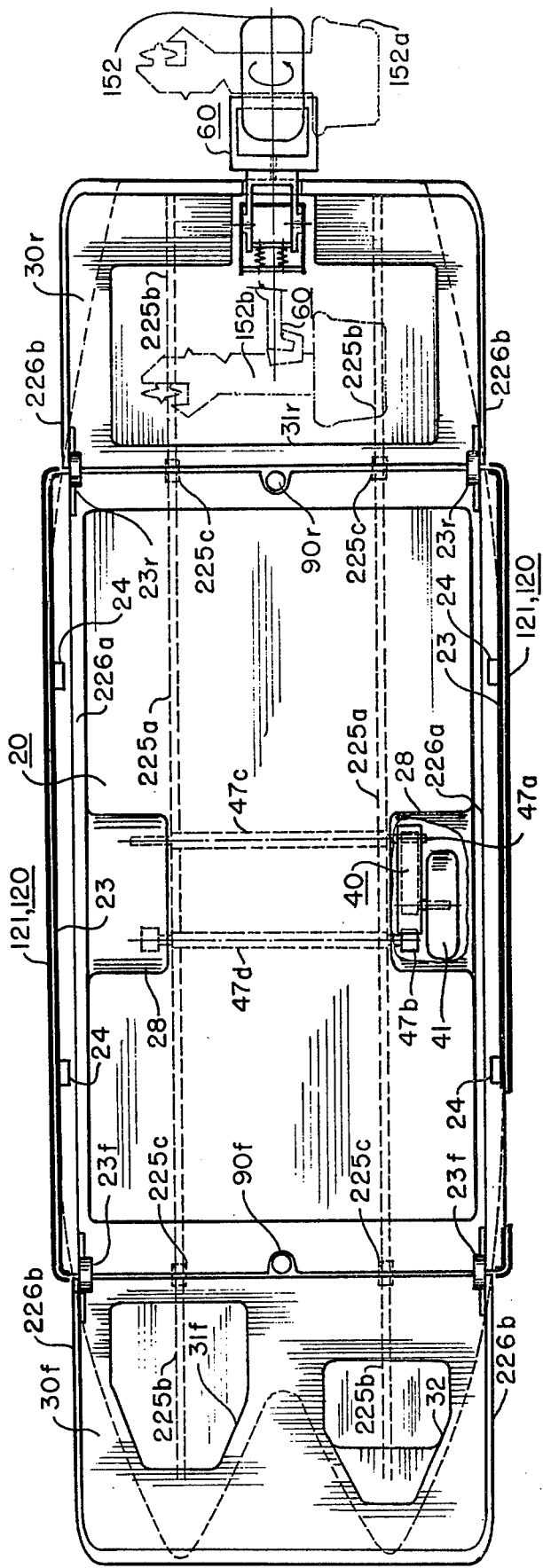
FIG. 4 is a top partially cross-sectional view of such camper with its associated end sections in their fully extended positions.

FIG. 4 is a top partially cross-sectional view showing base section 20 and both end section 30f and 30r in their fully extended positions. Shown in this figure are wheel wells 28 located along the sides of base section 20 and which house suspension system 40 and associated components. Also shown are laterally directed members 47c and 47d which together with fins 225a form part of a rigid camper frame. Suspension beam axles 47a and 47b are direct extensions of lateral members 47c and 47d. The shapes of upper portion 23 of base section 20, and bottom portions 121 of roof assembly 120 are apparent from this figure and FIG. 3. Also shown are the relative locations of hinges 23f and 23r; telescoping means 24; jack assemblies 90f and 90r; and fin members 225a and 225b. Retractable engine mount 60, which is located on end section 30r, and associated outboard engine 152 are also illustrated. It is apparent that the tow bar and bumper assemblies have been removed.

Rigidity of this amphibious structure is achieved by locking fin members 225a to fin members 225b by means of latches at 225c. Top end stiffeners 226a of base section 20 and top edge stiffeners 226b of end sections 30r and 30f are held together by hinges 23f and 23r thereby contributing to the lateral rigidity of the overall structure. Use of fine members 225a and 225b in combination with top stiffeners 226a and 226b permits locating hinges 23f and 23r at the corners of the respective sections. Top edge stiffeners 226a can be either separate members attached to their associated sections or integrally built with such associated sections. The combination comprising the hinge means and the top edge stiffeners therefore allows the direct transfer of compressive and tensile longitudinal forces as well as lateral forces applied to the sides of the sections.

End sections 30f and 30r and base section 20 form three independent watertight compartments, each section having walls on all sides. Storage compartments 31f and 31r and cockpit space 32 are shown as part of end sections 30f and 30r. Deck and access doors covering the end sections are included but not shown.

Outboard engine 152 is clamped to engine mount 60, which mont enables manipulation of engine 152 to horizontal position 152a and to position 152b located inside end section 30r. Engine mount 60 advantageously includes a spring loaded counter-balance system for effecting these positions.

FIG. 5 is a side view of camper 10 in a configuration intermediate the towing and camping configurations. Shown in this figure are bottom and upper portions 21 and 23 of base section 20. Bottom portion 21 includes a rectangular horizontal floor member; two rectangular vertical ends; two rectangular curved vertical sides; two top edge stiffeners which are part of the curved vertical sides; and two top edge stiffeners which are part of the rectangular vertical ends. Similarly, upper portion 23 includes two rectangular vertical sides into which are cut part of door opening 23b and miscellaneous service openings, not shown. Also shown in this figure are roof portion 123 and bottom portion 121 of roof assembly 120. Roof portion 123 includes a rectangular horizontal member while bottom portion 121 includes two rectangular vertical sides into which are cut window openings 121a and door opening 121b. An associated door, not shown, can be made of two separate panels. The upper panel thereof can hinge down or can telescope with respect to the lower panel in the vertical direction coincident with the vertical movement of roof assembly 120.

According to the present invention, end panels 122f and 122r are rotatable about horizontal laterally directed hinges 125f and 125r respectively located at the front and rear of assembly 120. Assembly 120 also includes end wall panels 124f and 124r which are rotatable about horizontal laterally directed hinges 126f and 126r respectively located at the extreme ends of end panels 122f and 122r. Finally, base section 20 includes telescoping means 24 for vertically adjusting the position of roof assembly 120 relative to the base section. See FIG. 3.

According to the present invention, end sections 30f and 30r are rotatable relative to base section 20 about horizontal laterally directed hinges 23f and 23r respectively located at the front and rear corners of the base section. Each end section includes compound curved floor member; side walls; a rectangular vertical end adjacent base section 20; two top edge stiffeners which are part of the side walls; and two top edge stiffeners which are part of the end walls. The floor member is substantially horizontal at the end which is adjacent the base section. Hinges 23f and 23r may incorporate a gear mechanism, not shown, for facilitating the conversion of camper 10 from the towing to other configurations. Furthermore, torsion bar balancing systems can be installed between base section 20 and end sections 30f and 30r so as to minimize the forces required to unfold the end sections with respect to the base section.

In this illustrative intermediate configuration, end section 30r is coextensive with base section while end section 30f remains positioned on top of the base section; wheels 41 of suspension system 40 and jack assemblies 90f and 90r are in their respective lowermost positions; and roof assembly 120 is in its uppermost position. End panels 122f and 122r are oriented horizontally, and wall panel 124f remaining within associated end panel 122f and end wall panel 124r being oriented at some angle relative to associated end panel 122r. The jack assemblies, which include swivelable wheels, also serve to support camper 10. Outboard engine 152 and associated engine mount 60 are shown in their storage and folded out positions.

A feature of the present invention is that fin members 225a of base section 20 and fin members 225b of end section 30r are used to rigidly secure such sections. The interconnection function can be effected by latches or by causing projecting sleeves located on one fin member to engage recesses on the other fin member, lateral rods or pins thereafter being inserted through aligned openings in such fin members. Such interconnection of the sections via their respective fin members can occur at location 225c. A similar explanation applies to fin member 225b of end section 30f.

FIG. 6 is a side view of camper 10 in a basic camping configuration. In this configuration, end sections 30f and 30r are coextensive with base section 20; wheels 41 and jack assemblies 90f and 90r are in respective raised positions; roof assembly 120 is in its uppermost position; and end panels 122f and 122r and respectively associated end wall panels 124f and 124r are oriented so that the free ends of the latter panels rest onto the extreme ends of end sections 30f and 30r, respectively. Enclosing the front and rear portions of camper 10 are end side walls 127f and 127r, which walls respectively include window openings 128f and 128r and pivot about horizontal axes 23f and 23r respectively. In a manner similar to that explained before, fin members 225a and 225b of base section 20 and end sections 30f and 30r, respectively, are mechanically interlocked at 225c. Steps 151 can be provided for facilitating entering and exiting the camper. According to the present invention, retractable suspension system 40, in cooperation with jack assemblies 90f and 90r, can be appropriately adjusted for leveling camper 10, if necessary. During this configuration, the fin members act as mechanical interlocking means, provide structural ties, and act as a base for the camper. Outboard engine 152, together with folding engine mount 60, remain in storage position 152b within end section 30r.

FIG. 7 is a side view of camper 10 in a basic boating configuration. This configuration is substantially equivalent to the camping configuration of FIG. 6 except that suspension system 40 and jack assemblies 90f and 90r are in their respective uppermost positions. This, of course, is done to reduce water drag while camper 10 is in motion during this configuration. As a matter of convenience, end side walls 127f and 127r are not included. Outboard engine 152 is fixedly attached to the rear end of section 30r via engine mount 60. Mount 60 comprises a frame attached to a spring balanced yoke. The frame can be rotated with respect to the yoke so as to place the outboard engine in the horizontal position, after which the whole assembly including the engine can be folded into end section 30r. This therefore allows storage of engine 152 within end section 30r without removing the engine from camper 10. This mount is further described with respect to FIGS. 12A and 12B. In such a case, end section 30r can be folded on top of base section 20 without removal of the engine.

It will be apparent to those skilled in the art that camper 10 can be launched by advantageously utilizing suspension system 40 and jack assemblies 90f and 90r. These elements are, of course, retracted once the camper is in water. According to the present invention, each section is capable of floating independently of the other two sections. During this configuration, the fin members provide both structural and navigational stability.

FIG. 8 is a side view of camper 10 in another basic boating configuration. This configuration is substantially equivalent to the boating configuration of FIG. 7 except that end panels 124f and 124r have been folded into associated end panels 122f and 122r. In addition, end panel 122f together with end wall panel 124f have been folded inside roof assembly 120 while end panel 122r has been extended rearward away from roof assembly 120 with associated end wall panel 124r folded inside end panel 122r.

Figure 9A:
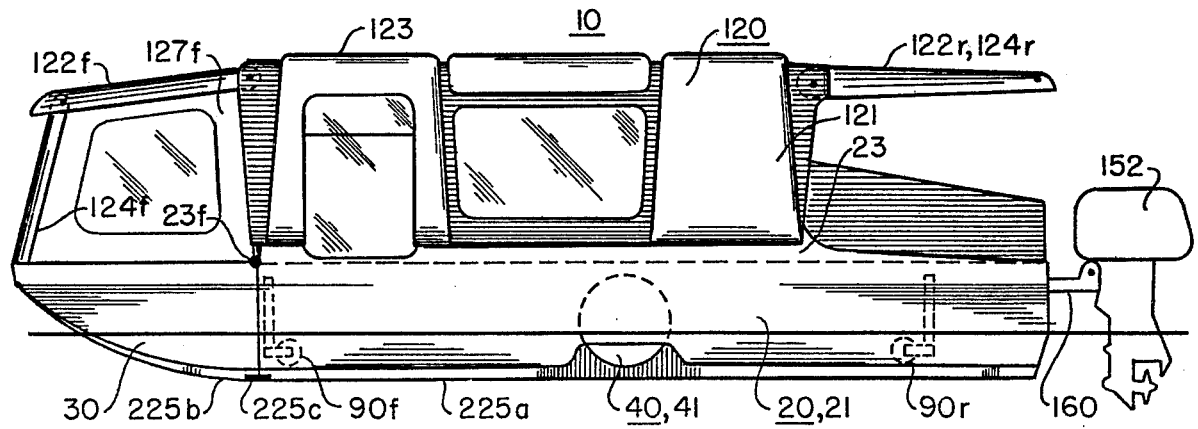
FIG. 9A is a side view of such camper in a low-profile boating configuration.
Figure 9:
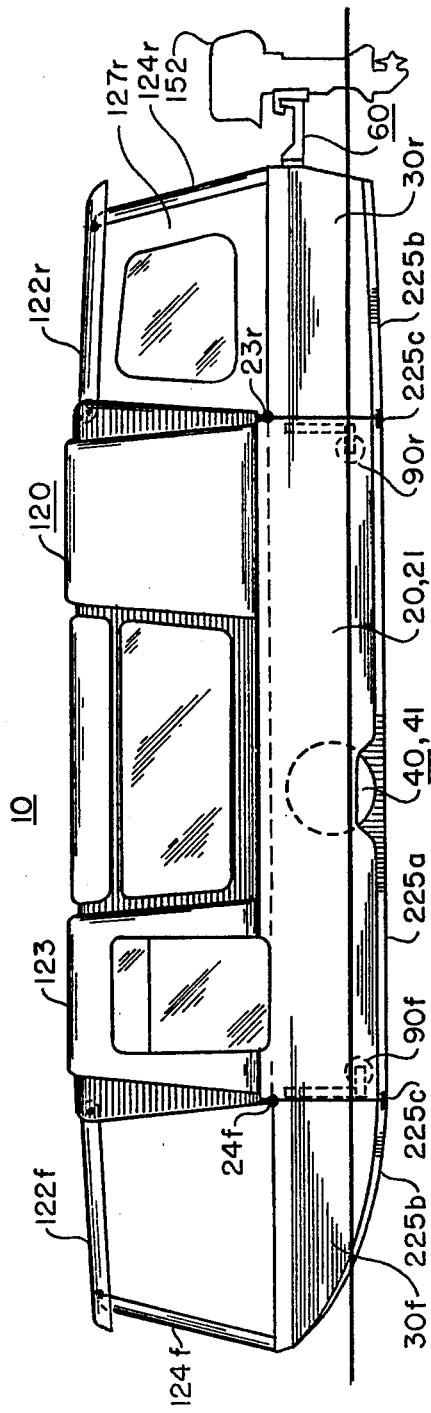
FIG. 9 is a side view of such camper in a low-profile boating configuration.

FIG. 9 is a side view of camper 10 in a low-profile boating configuration. This configuration is substantially equivalent to the boating configuration of FIG. 7 except that roof assembly 120 has been lowered to such an extent that end panels 122f and 122r are substantially horizontal. In this case, end side wall 127r has been included. This low-profile configuration, which results in minimized wind resistance during water travel, is readily adaptable to the camping configuration. It is therefore apparent that camper 10 allows for numerous camping and boating configurations and yet provides for a compact towing configuration.

FIGS. 1A and 9A describe a second illustrative embodiment of an amphibious camper according to the present invention.

Figure 3A:
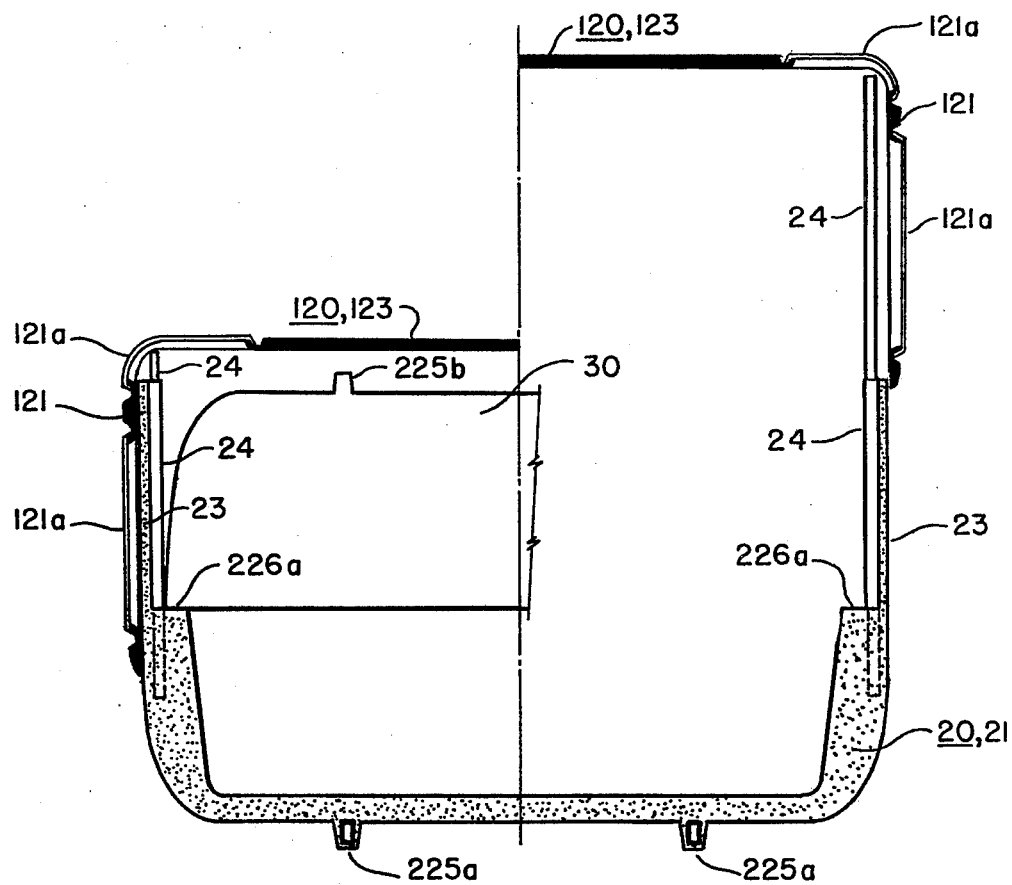
FIG. 3A is an end cross-sectional view of such camper's base section.

FIGS. 1A and 2A are side and end views, respectively, of a towable amphibious camper in the towing configuration according to the present invention while FIG. 3A is an end cross-sectional view of the camper's base section. Amphibious camper 10 substantially comprises base section 20 and front end section 30. The length of end section 30 is somewhat less than half the overall length of the base section. Base section 20 further comprises retractable suspension system 40; tow bar assembly 70; bumper assembly 80; front and rear jack assemblies 90f and 90r, respectively; roof assembly 120; and bottom fin members 225a. End section 30 further comprises bottom fin members 225b, as shown in FIG. 3A and FIG. 1A. Jack assemblies 90f and 90r and roof assembly 120 are vertically adjustable as will be hereinafter explained.

Associated with suspension system 40 are wheels 41, which substantially support camper 10 in the towing configuration. Roof assembly 120 includes front and rear end panels 122f and and 122r, respectively, which panels are vertically and slopingly directed in this towing configuration and which are rotatably attached onto assembly 120 as will be hereinafter explained.

Attached to the sides of base section 20 are marker lights or reflectors 220 while attached to one end panel 122f are combination tail-directional lights 221 and combination license plate-light 222.

The front end of camper 10 is defined as the front end during the boating configuration. This, again, does not necessarily define the front end during the towing configuration.

The front-rear direction of base section 20 defines the camper's longitudinal direction. In light thereof, end section 30; end panels 122f and 122r; and wheels 41 are rotatable about respective axes which are perpendicular to such longitudinal direction. In addition, fin members 225a of base section 20 and fin members 225b of end section 30 are directed along such longitudinal direction.

According to the present invention, in this towing configuration, end section 30 is folded over and positioned onto base section 20; wheels 41 of suspension system 40 and roof assembly 120 are in their respective lowermost positions; tow bar and bumper assemblies 70 and 80 are fixedly connected to the front and rear ends of base section 20, respectively; jack assemblies 90f and 90r are in their respective uppermost positions; and end panels 122f and 122r are vertically and slopingly oriented, respectively. Camper 10, of course, is towed via assembly 70 by an auto or other self-propelled vehicle, not shown. Outboard engine 152 is folded into a cavity at the rear end of base section 20 by means of a telescoping and pivoting engine mount. In this configuration, camper 10 can be adapted for towing on snow or ice by a snowmobile or other similar machine simply by replacing wheels 41 with skis, not shown.

Figure 4A:
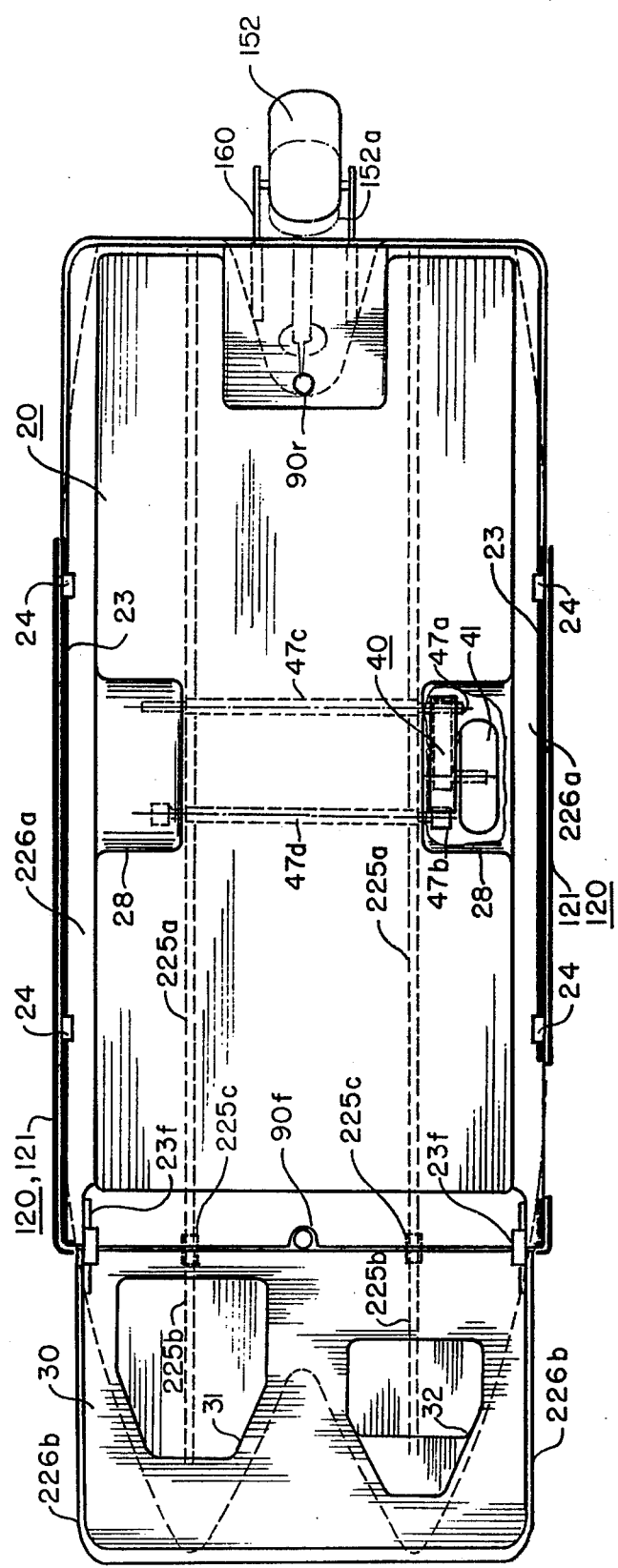
FIG. 4A is a top partially cross-sectional view of such camper with its associated end section in the fully extended position.

FIG. 4A is a top partially cross-sectional view showing base section 20 and end section 30 in its fully extended position. Shown in this figure are wheel wells 28 located along the sides of base section 20 which house suspension system 40 and associated components. Also shown are horizontal laterally directed members 47c and 47d which together with fins 225a form part of a rigid camper frame. The shapes of upper portion 23 of base section 20, and bottom portion 121 of roof assembly 120 are apparent from this figure. Also shown are the relative locations of hinges 23f; roof telescoping means 225a and 225b. Telescoping and pivoting engine mount 160, which is also illustrated together with outboard engine 152. It is apparent that the tow bar and bumper assemblies have been removed. Rigidity of the amphibious structure is achieved by locking fin members 225a to fin members 225b by means of latches at 225c. Top edge stiffeners 226a of base section 20 and top edge stiffeners 226b of end section 30 are held together by hinges 23f thereby further contributing to the lateral rigidity of the overall structure. Use of fin members 225a and 225b in combination with top edge stiffeners 226a and 226b permits locating hinges 23f at the upper corners of the respective sections.

End section 30 and base section 20 form two separate watertight compartments, each section having walls on all sides. Storage compartment 31 and cockpit space 32 are shown as part of end section 30. Deck and access doors covering end section 30 are included but not shown. Outboard engine 152 is clamped to telescoping and pivoting engine mount 160. This enables one to slide and fold the engine to position 152a, located partially into the cavity underneath the rear end of base section 20.

Figure 5A:
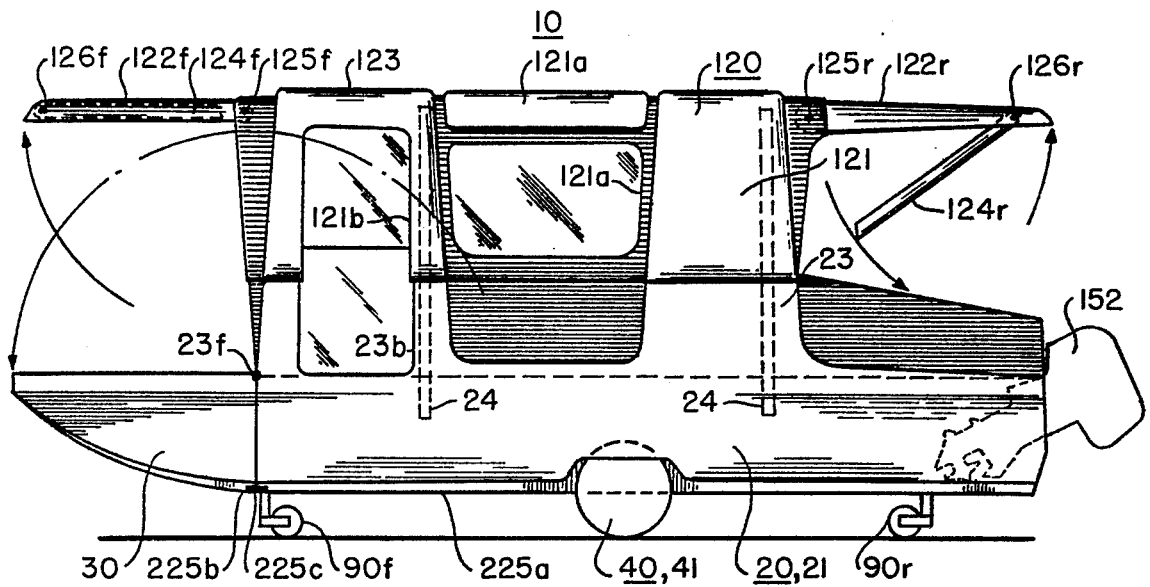
FIG. 5A is a side view of such camper in a configuration intermediate the towing and camping configurations.

FIG. 5A is a side view of camper 10 in a configuration intermediate the towing and camping configurations. Shown in this Figure are bottom and upper portions 21 and 23 of base section 20. Botton portion 21 includes a rectangular horizontal floor member; two rectangular vertical ends; two rectangular curved vertical sides; two top edge stiffeners which are part of the curved vertical sides; and two top edge stiffeners which are part of the rectangular vertical ends. Similarly, upper portion 23 includes two rectangular vertical sides and one rectangular vartical end into which are cut part of door opening 23b and miscellaneous service openings, not shown. Also shown in this Figure are roof portion 123 and bottom portion 121 of roof assembly 120. Roof portion 123 includes a rectangular horizontal member while bottom portion 121 includes two rectangular vertical sides into which are cut window openings 121a and door opening 121b. An associated door, not shown, can be made of two separate panels. The upper panel can hinge down or can telescope with respect to the lower panel in the vertical direction coincident with the vertical movement of roof assembly 120.

According to the present invention, end panels 122f and 122r are rotatable about horizontal laterally directed hinges 125f and 125r respectively located at the front and rear of assembly 120. Assembly 120 also includes end wall panels 124f and 124r which are rotatable about horizontal laterally directed hinges 126f and 126r respectively located at the ends of end panels 122f and 122r. Finally, base section 20 includes telescoping means 24 for vertically adjusting the position of roof assembly 120 relative to the base section. See FIG. 3A.

According to the present invention, end section 30 is rotatable relative to base section 20 about horizontal laterally directed hinges 23f located at the front upper corners of the base section. End section 30 includes a compound curved floor member; side walls; and a rectangular vertical end adjacent base section 20. End section 30 includes two top edge stiffeners which are part of the side walls; one top edge stiffener which is part of the rectangular vertical end; and one top edge stiffener which is part of the top end of the floor member. The floor member is substantially horizontal at the end which is adjacent the base section while such floor member is substantially vertical at its other end. Hinges 23f may incorporate a gear mechanism for facilitating the conversion of camper 10 from the towing to other configurations. Furthermore, a torsion bar balancing system can be installed between base section 20 and end section 30 so as to minimize the forces required to unfold end section 30 with respect to base section 20.

In this illustrative intermediate configuration, end section 30 is coextensive with base section 20; wheels 41 of suspension system 40 and jack assemblies 90f and 90r are in their respective lowermost positions; and roof assembly 120 is in its uppermost position. End panels 122f and 122r are oriented horizontally, end wall panel 124f remaining within associated end panel 122f and end wall panel 124r being oriented at some angle relative to associated end panel 122r. The jack assemblies, which include swivelable wheels, also serve to support camper 10. Outboard engine 152 is shown at its storage position.

A feature of the present invention is that fin members 225a of base section 20 and fin members 225b of end section 30 are used to rigidly secure such sections. The interconnection function can be effected by latches or by causing projecting sleeves located on one fin member to engage recesses on the other fin member, lateral rods or pins thereafter being inserted through aligned openings in such fin members. This would advantageously be effected at location 225c.

Figure 6A:
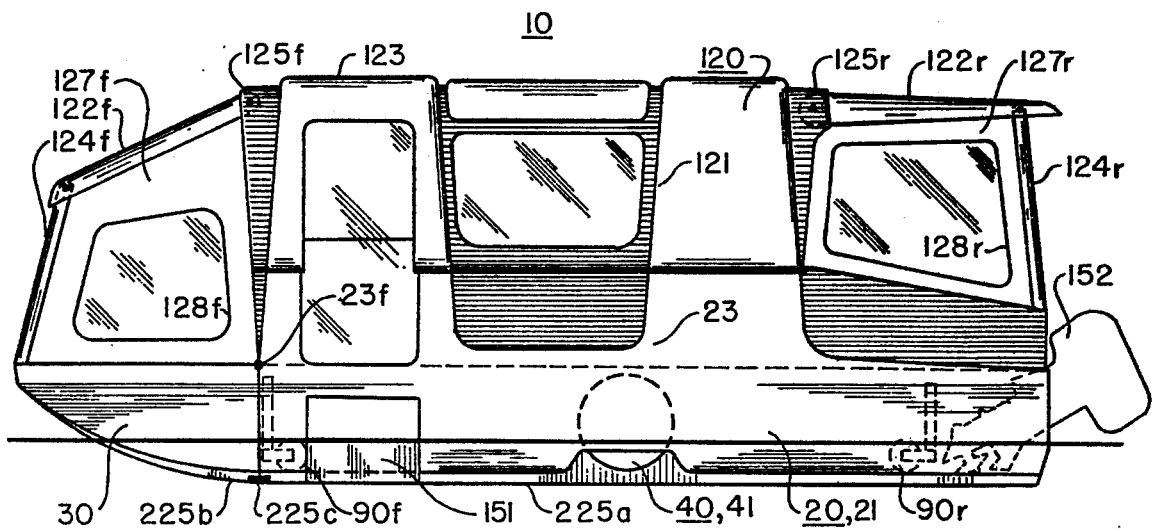
FIG. 6A is a side view of such camper in a basic camping configuration.

FIG. 6A is a side view of camper 10 in a basic camping configuration. In this configuration, end section 30 is coextensive with base section 20; wheels 41 and jack assemblies 90f and 90r are in respective raised positions; roof assembly 120 is in its uppermost position; and end panels 122f and 122r and respectively associated end wall panels 124f and 124r are oriented so that the free ends of the latter panels rest onto the extreme ends of sections 30 and 20, respectively. Enclosing the front and rear portions of camper 10 are end side walls 127f and 127r, which walls respectively include window openings 128f and 128r. In a manner similar to that explained before, fin members 225a and 225b of base section 20 and end section 30, respectively, are mechanically interlocked at 225c. Steps 151 can be provided for facilitating entering and exiting the camper. According to the present invention, suspension system 40, in cooperation with jack assemblies 90f and 90r, can be appropriately adjusted for leveling camper 10, if necessary. During this configuration, the fin members act as mechanical interlocking means, provide structural ties, and act as a base for the camper. Outboard engine 152 is in its storage position.

Figure 7A:
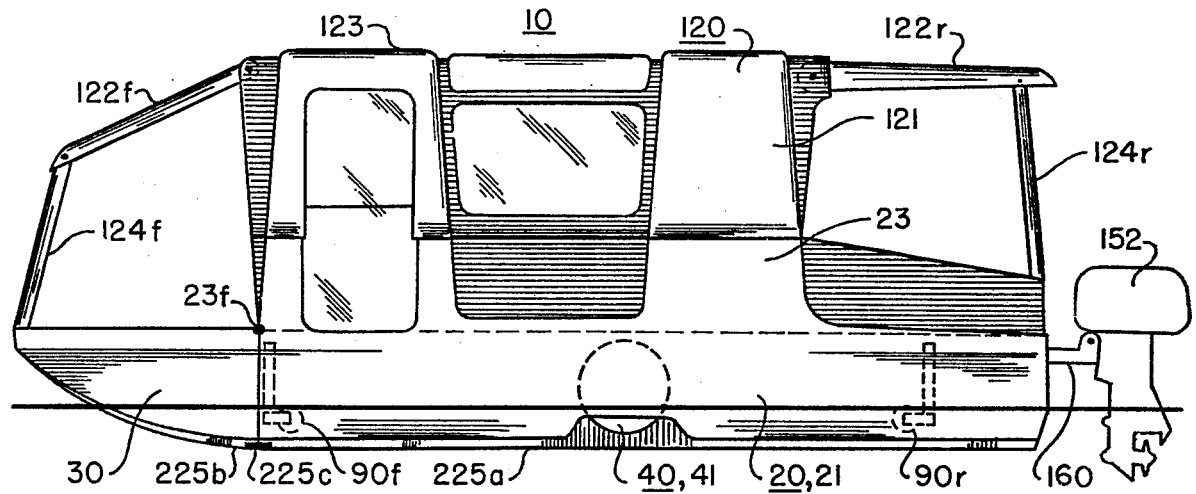
FIG. 7A is a side view of such camper in a basic boating configuration.

FIG. 7A is a side view of camper 10 in a basic boating configuration. This configuration is substantially equivalent to the camping configuration of FIG. 6A except that suspension system 40 and jack assemblies 90f and 90r are in their respective uppermost positions. This, of course, is done to reduce water drag while camper 10 is in motion during this configuration. As a matter of convenience, end side walls 127f and 127r are not included. Outboard engine 152 is fixedly attached to the rear end of section 20 via engine mount 160. Mount 160 can comprise a plate attached to two telescoping and/or hinged bars, which bars are retractable, slidable, or foldable relative to section 20. This therefore allows storage of engine 152 without removing the engine from camper 10.

It will be apparent to those skilled in the art that camper 10 can be launched by advantageously utilizing suspension system 40 and/or jack assemblies 90f and 90r. These elements are, of course, retracted once the camper is in water. According to the present invention, each section is capable of floating independently of the other section. During this configuration, the fin members provide both structural and navigational stability.

Figure 8A:
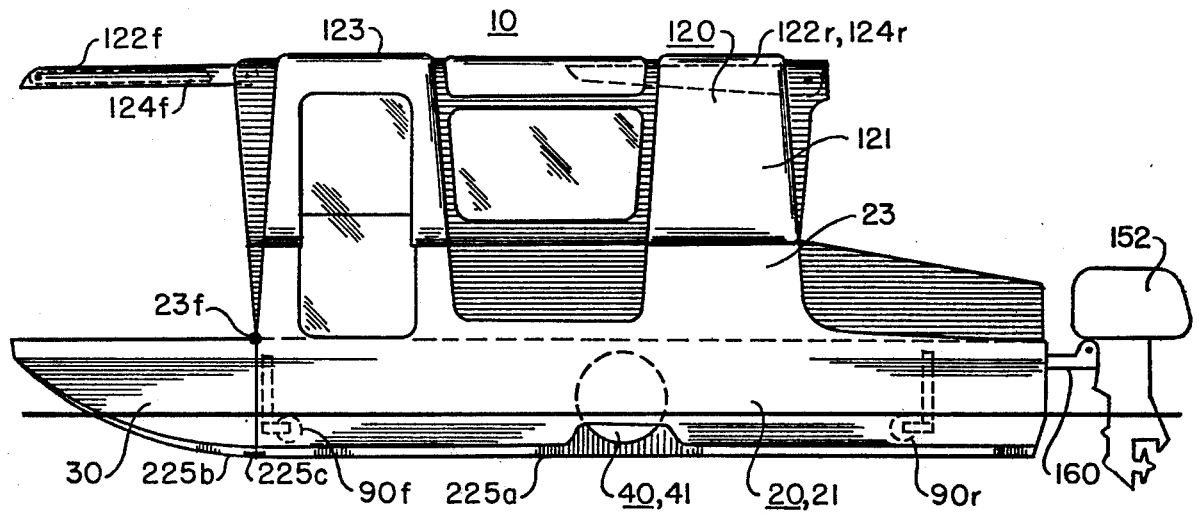
FIG. 8A is a side view of such camper in another basic boating configuration.

FIG. 8A is a side view of camper 10 in another basic boating configuration. This configuration is substantially equivalent to the boating configuration of FIG. 7A except that end wall panels 124f and 124r have been folded into associated end panels 122f and 122r. In addition, end panel 122f has been extended forward away from roof assembly 120 while end panel 122r has been folded inside of roof portion 123.

FIG. 9A is a side view of camper 10 in a low-profile boating configuration. This configuration is substantially equivalent to the boating configuration of FIG. 7A except that roof assembly 120 has been lowered to such an extent that end panels 122f and 122r are substantially horizontal. In this case, end side wall 127f has been included. This low-profile configuration, which results in minimized wind resistance during water travel, is readily adaptable to the camping configuration. It is therefore apparent that camper 10 allows for numerous camping and boating configurations and yet provides for a compact towing configuration.

Figure 10:
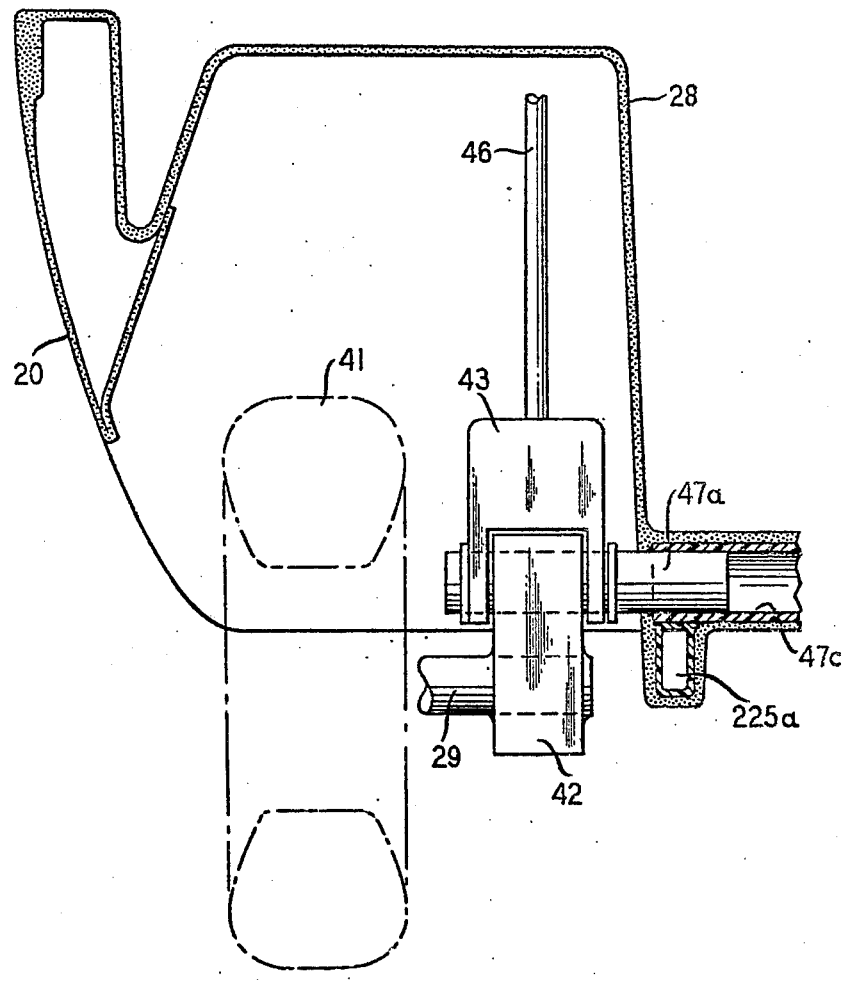
Figure 10:
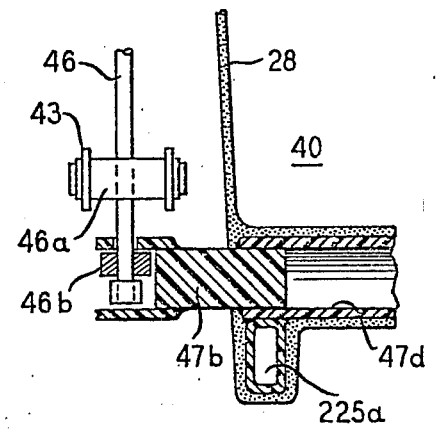

FIG. 10A is a side view of a first illustrative embodiment of the camper's retractable suspension system 40 according to the present invention while FIGS. 10B and 10C are end partially cross-sectional views through aforementioned first and second suspension beam axles 47a and 47b, respectively.

Retractable suspension system 40 substantially comprises wheel 41 and associated axle 29; bottom and top suspension arms 42 and 43, respectively; spring 44 and associated shock absorber 44a; first and second suspension beam axles 47a and 47b, respectively; and jackscrew assembly 46 including jackscrew 46d, jackscrew nut 46a, jackscrew pivot-bearing 46b, and crank 46c. Wheel 41 is rotatably mounted onto associated axle 29, which axle is horizontal and perpendicular to the camper's longitudinal direction. Suspension beam axles 47a and 47b are also horizontal and perpendicular to such longitudinal direction. These beam axles are fixed relative to base section 20 over the fin structure 225a as shown in FIGS. 10B and 10C. Wheel axle 29 is normally located substantially intermediate the two beam axles. Wheel axle 29 is fixedly attached to the first end of bottom suspension arm 42 while first suspension beam axle 47a is rotatably attached to the second end. Bottom suspension arm 42, which extends along the camper's longitudinal direction and which is substantially horizontal during the towing configuration, is therefore rotatable relative to first suspension beam axle 47a. The first end of top suspension arm 43 is also rotatably attached to first suspension beam axle 47a. In other words, the top suspension arm, which also extends along the camper's longitudinal direction and which is substantially horizontal during the towing configuration, is also rotatable relative to the first suspension beam axle. Now, jackscrew nut 46a connects the second end of top suspension arm 43 to an intermediate portion of jackscrew 46d while jackscrew pivot-bearing 46b connects the first or lower end of the jackscrew to second suspension beam axle 47b, as will be hereinafter explained. Crank 46c is attached to the second or upper end of jackscrew 46d. The second end of top suspension arm 43 is substantially adjacent the first end of jackscrew 46d during the towing configuration. The two beam axles are part of the aforementioned internal frame which supports base section 120. The ends of the two beam axles extend into wheel wells 28 located along the sides of base section 20. See FIGS. 4 and 4A. The first or lower end of spring 44 is fixedly attached via retainer 45 to the first end of bottom suspension arm 42 while the second or upper end of the spring is fixedly attached via retainer 48 to an intermediate portion of top suspension arm 43. The spring is substantially vertical during the towing configuration. Bumper 49, which is attached to the top suspension arm, prevents contact between the two suspension arms while shock absorber 44a damps the arms' relative motion. Suspension beam axle 47a and 47b are extensions of aforementioned lateral members 47c and 47d which comprise part of the camper frame. Suspension beam axle 47a and 47b extend into wheel wells 28 located along the sides of base section 20.

Jackscrew nut 46a allows for rotation of jackscrew 46d about its own axis and for rotation of top suspension arm 43 about suspension beam axle 47a whereby the second end of the top suspension arm rides axially along the jackscrew. Jackscrew pivot-bearing 46b allows for rotation of jackscrew 46d about its own axis and for rotation of the jackscrew's first end about second suspension beam axle 47b.

Now, rotation of jackscrew 46d about its own axis in a first direction causes the second end of top suspension arm 43 to ride up axially along the jackscrew, thereby rotating the top suspension arm about first suspension beam axle 47a. This, in turn, causes spring 44 to pull up the first end of bottom suspension arm 42, thereby rotating the bottom suspension arm relative to the first suspension beam axle. This, of course, results in the retraction of wheel axle 29 and associated wheel 41 up into wheel well 28. This is illustrated by position 41 of the wheel. In the boating configuration, the bottom and top suspension arms are substantially vertical while the spring is substantially horizontal. Rotation of the jackscrew in the second direction results in the lowering of the wheel.

Reference to FIGS. 10B and 10C illustrates that suspension beam axles 47a and 47b and respectively associated frame members 47c and 47d are rigidly connected to fin members 225a and together form a rigid frame which supports camper 10 while the camper is being supported by wheels 41. A feature of the present invention is that suspension beam axles 47a and 47b provide low pivot points. This allows for use of stiff straight-through members 47c and 47d as part of the camper support frame and for maintaining jackscrew 46d in tension.

In the alternative, shock absorber 44a can be placed externally of spring 44. Thus, an adjustable compressed air suspension unit, not shown, can be placed inside spring 44 thereby allowing adjustment of the suspension for various load or terrain conditions. Further, steel spring 44 can be replaced by an elastomer spring system, also not shown.

As another alternative, the second end of bottom suspension arm 42 can be rotatably attached to the first end of top suspension arm 43 by means of a separate pivot, not shown, instead of attaching suspension beam axle 47a directly to the second end of bottom suspension arm 42. In either case, vibration mounts, not shown, can be associated with the attachment.

FIG. 11A is a side view of a second illustrative embodiment of the camper's retractable suspension system 40 according to the present invention, while FIG. 11B is an end partially cross-sectional view through aforementioned first suspension beam axle 47a.

Retractable suspension system 40 substantially comprises wheel 41 and associated axle 29; bottom and top suspension arms 142 and 143, respectively, and associated pivot assembly 148; first and second suspension beam axles 47a and 47b, respectively; and jackscrew assembly 46 including jackscrew 46d, jackscrew nut 46a, jackscrew bearing-pivot 46b, and crank 46c. The wheel, wheel axle, the first end of the bottom suspension arm, the first and second ends of the top suspension arm, the jackscrew nut, the jackscrew pivot-bearing, the jackscrew, and the crank are substantially related to each other and to base section 20 as before. Bumper 49 of the top suspension arm also serves a similar function.

In this embodiment, pivot assembly 148 includes a U-shaped member associated with arm 143 and a cylindrical elastomer spring assembly associated with arm 142. The U-shaped member has first and second vertically extending portions 148a and 148b interconnecting hollow lower portion 148c. The elastomer spring assembly further includes laterally directed central shaft 148d, hollow cylindrical elastomer member 145 fixedly attached to the central shaft, and thin cylindrical outer sleeve 144 fixedly attached to the elastomer member. The ends of the inner central shaft are fixedly attached to the extending portions. The first suspension beam axle fits into the lower hollow portion of the U-shaped member and is rotatable with respect thereto. The second end of the bottom suspension arm is rigidly to the outer sleeve while the first end of the top suspension arm is rigidly attached to vertically extending portion 148b. In this particular embodiment, it is apparent that outer sleeve 144 is built integrally with arm 142 while extending portions 148a and 148b and hollow lower portion 148c is built integrally with arm 143.

Again, rotation of jackscrew 46d about its axis in a first direction results in the retraction of the wheel to position 41' while rotation of the jackscrew in the second direction results in lowering of the wheel. Again, suspension beam axles 47a and 47b and respectively associated frame members 47c and 47d are rigidly connected to fin members 225a and together form a rigid frame which supports camper 10 while the camper is being suspended by wheels 41.

Base section 20, which can advantageously be made of either fiberglass or metal or a combination thereof, is the main body portion of camper 10 and provides an enclosed shelter space in both the camping and boating configurations. Double-skin foam or single-skin stiffened construction can be advantageously utilized. Top stiffeners or ribs which are an integral part of base section 20 connect hinges 23f and/or 23r to the respective section or sections. Bottom portion 21 can be stiffened by using double-skin foam construction, corrugations, or single-skin stiffened construction. End section 30 or end sections 30f and 30r can serve as bedding means or as open decks, the interior portions thereof being utilizabe as storage space. The end sections can advantageously be made of fiberglass, metal, or plywood. Again, single-skin construction can be utilized.

FIGS. 12A and 12B are top and side views, respectively, of an illustrative embodiment of mount assembly 60 according to the present invention. Shown in these figures are engine mounting frame 61, engine frame pivot 62, engine frame spring loaded lock pin 63, engine mount yoke 64, yoke pivots 65, yoke spring loaded lock pin 66, yoke tie rod 67, mount base 68, mount base tie rod 69, springs 69a, camper rear end section 30r, and outboard engine 152.

Outboard engine mount assembly 60 is bolted to end section 30r through mount base 68. Outboard engine 152 is clamped to engine mounting frame 61 and is shown in the boating position. In order to fold outboard engine 152 into storage position 152b, the engine mounting frame spring loaded lock pin 63 is pulled out of a first hole in yoke 64. Thereafter, outboard engine 152, together with engine mounting frame 61, is rotated 90 degrees around engine frame pivot 62 to engine position 152a. At this position, the engine frame spring loaded lock pin 63 engages a second hole in yoke 64 thereby preventing further rotation. Now, yoke spring loaded lock pin 66 is pulled out of a first hole in mount base 68. Thereafter, engine 152, together with engine mounting frame 61 and yoke 64, are rotated around yoke pivots 65, 180 degrees relative to mount base 68 from engine position 152a to engine storage position 152b. At this position, yoke spring loaded lock pin 66 engages a second hole in the mount base thereby preventing further rotation. The procedure for moving the engine from the storage position to the boating position is similar, except in reverse. The weight of outboard engine 152 is at all times nearly counterbalanced by spring 69a located between engine mount yoke 64 and mount base 68 through the rods 67 and 69.

Outboard engine mount assembly 60 is a self-contained compact unit and requires only the connection of mount base 68 to section 30r. Various sizes of springs 69a, shapes of yoke 68 and engine mounting frame 61 can be utilized to accommodate different sizes of outboard engines.

Figure 13A:
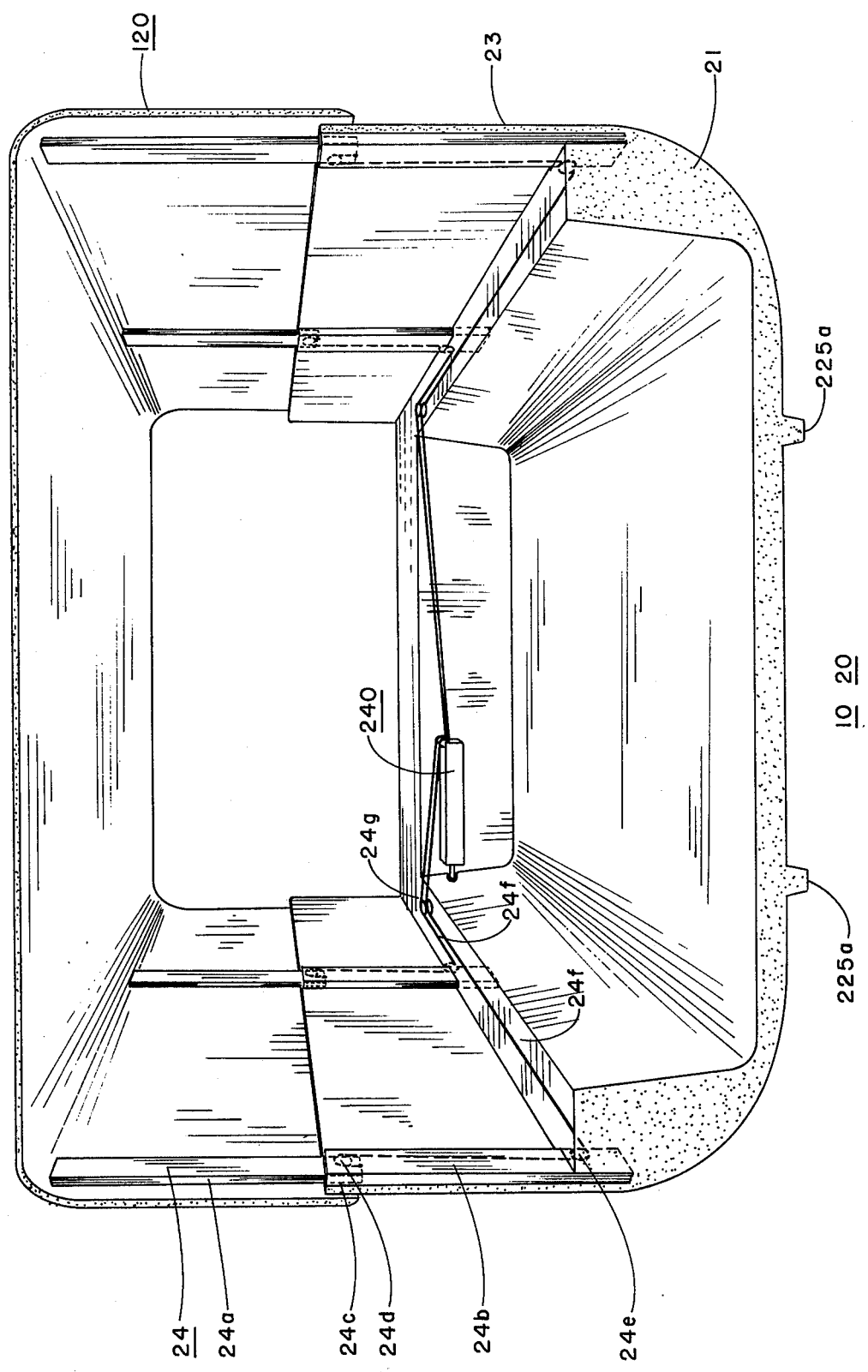
Figure 13B:
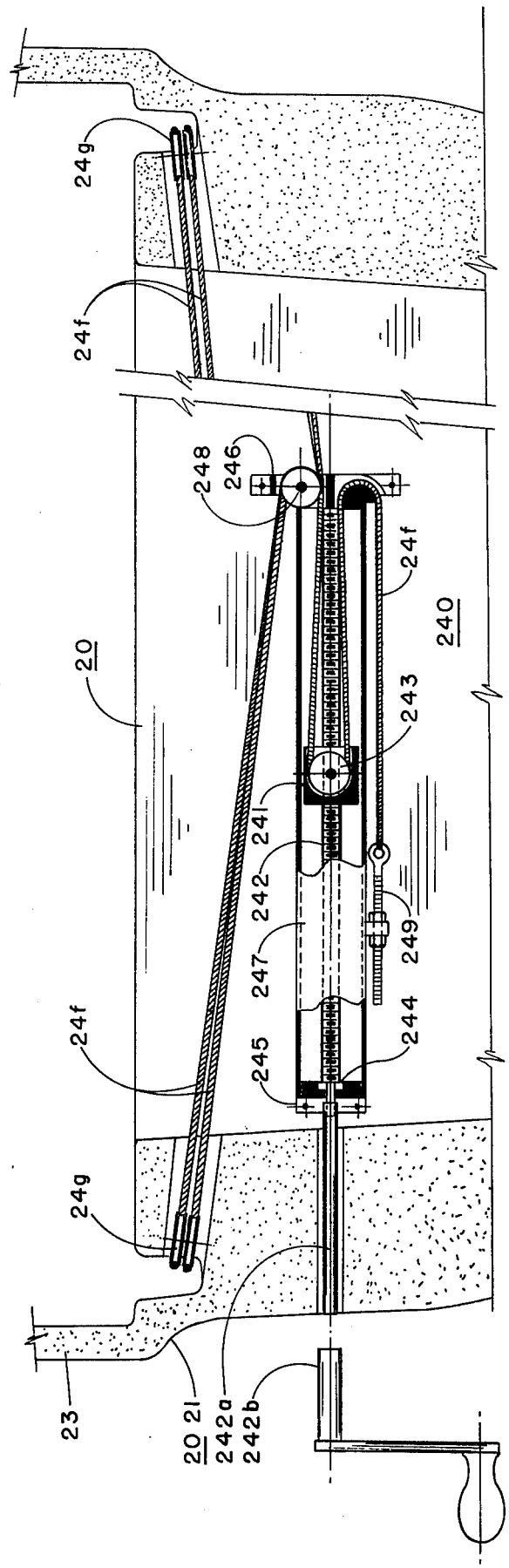
FIG. 13B is a partially cross-sectional view of such vertical position adjusting means.

FIG. 13A is an end cross-sectional view of base section 20 illustrative of means for adjusting the vertical position of roof assembly 120 while FIG. 13B is a partially cross-sectional view of such vertical position adjusting means. Each telescoping mean 24 consists of a sliding tubular post 24a, and fixed tubular post 24b. The fixed tubular posts 24b are rigidly fastened to the camper 10 center section 20. The sliding tubular posts 24a are free to slide in vertical direction within the fixed tubular posts 24b and are guided in lateral directions by guide shoes 24c on top of fixed tubular posts 24b. A cable sheave 24d is rotatably mounted to the inside of top end of each fixed tubular post 24b and another cable sheave 24e is rotatably mounted to the inside of bottom end of each fixed tubular post 24b. Each sliding tubular post is lifted and supported by cable 24f. Each cable 24f is connected to the bottom end of each sliding tubular post 24a, shall pass up, over sheave 24d, down around sheave 24e and horizontally within the groove (not shown) inside the side member of center section 21 to mule sheave 24g and around the mule sheave to the cable drive 240, described in FIG. 10B. All sliding tubular posts are vertically supported by cables 24f through device 240. By driving all cables simultaneously through drive 240, the roof is moved either up or down depending on whether the cables are shortened or lengthened. The cable drive consists of nut 241 which is horizontally driven by screw 242. The nut houses individual sheaves 243, one for each cable. The screw 242, is supported at both ends by bearings 244, part of or mounted into end caps 245 and 246 which enclose the ends of the tubular rectangular cable drive housing 227. End caps 245 and 246 have flanges and bolt holes for mounting the cable drive assembly to any horizontal or vertical surface. In addition, the end cap 246 contains one deflector sheave 248, for each cable and is shaped to form saddles to guide all individual cables of the tensioning eye bolts 249, fastened to the outside of cable drive housing 247. The screw 242 is driven by a shaft extension 242a and by a fixed or removable crank 242b from the outside of the camper. In addition, the screw can be driven by a gear motor (not shown) mounted to end of the screw 247. Now the cables 24f which support and move the telescoping means 24 pass around the deflector sheaves 248, around the sheaves 243 (part of end cap 246). All cables are fastened to individual eye bolts 249. It is obvious to those knowledgeable in the art, that by shortening the length of each cable outside the cable drive 240 each sliding post 24a would move up relative to fixed tubular post 24b and vice versa. The eye bolts are used to adjust the initial cable length and to level the roof assembly 120 during construction. Thereafter the roof is moved either up or down by turning the screw 242 thereby moving the nut 241 horizontally and increasing or decreasing the length of loop formed by cables 24f inside the cable drive 240. The screw thread is detached so as not to cause the screw to rotate under forces applied through the cable tension, parallel to screw 242. Therefore, the system is self-locking and does not require any additional devices for supporting the loads applied through the cables 24f by the weight of the roof assembly 120, shown on FIG. 10A to the nut 241. Therefore, the roof assembly 120 will stop at any vertical position within the limits of its travel when cranking is stopped or when the crank is removed.

Figure 14:
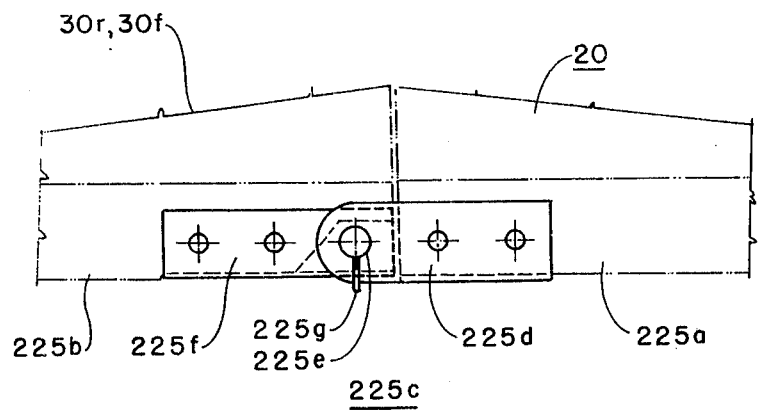
FIGS. 14A and 14B are side views of means for interlocking the end section's fin members with the base section's fin members and means for fixedly attaching the bumper assembly to the base section's fin members, respectively.
Figure 14:
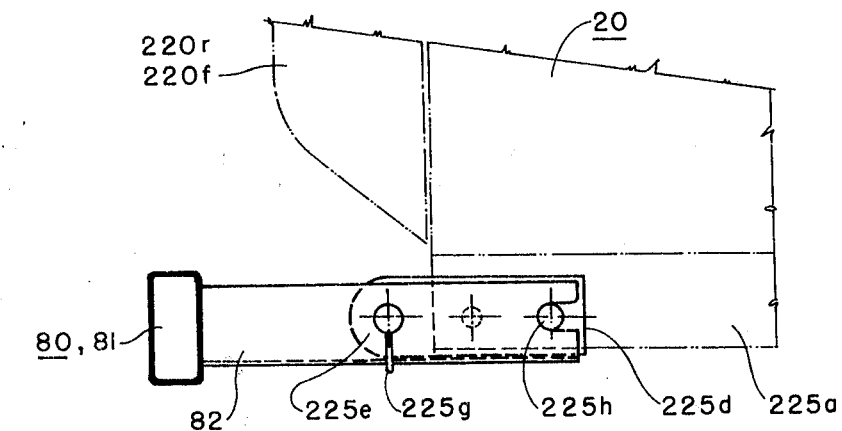

FIG. 14A is a side view of means for interlocking fin member 225a of center section 20 with fin member 225b of end sections 30r and 30f at locations 225c. See FIGS. 2A and 3. U-shaped plate 225d, whose inside face conforms with the shape of the outside face of fins 225a, can be riveted or bolted to to each end of each fin member 225a of center section 20. Each U-shaped plate 225d projects slightly past the end of each fin member 225a so as to form an extension to each fin member 225a with the top side of these extensions open. The extended portion of each U-shaped plate 225d incorporates two holes, one through each vertical side, which holes are properly aligned to receive lock pin 225e. Another U-shaped plate 225f with its outside face conforming with the shape of the outside face of fin member 225b is riveted or bolted to the end of each fin member 225b of the end sections. Each U-shaped plate 225f incorporates two holes, one through each vertical side, which holes are properly aligned with the holes in plate 225d and with lock pin 225e when the end sections are coextensive with center section 20 in the camping or boating configurations. When end section 30r, for example, is rotated from the towing configuration, each U-shaped plate 225f nests inside the corresponding extended portion of U-shaped plate 225d. By inserting lock pin 225e through the aligned holes in U-shaped plates 225d and 225f, continuity for the transfer of tensile and compressive forces is established between fin members 225a and 225b. Lateral forces are resisted by nesting fin member 225b with plate 225f inside U-shaped plate 225d. Lock pin 225e can be furnished with safety latch 225g to prevent the pin from disengaging.

FIG. 14B is a side view of means for fixedly attaching bumper assembly 80 to fin members 225a of center section 20. This attaching means utilizes U-shaped plate 225d and pin 225e. At the bumper end of center section 20, each U-shaped plate 225d uses two studs 225h with extended shoulders, which shoulders project to the outside of plate 225d.

Bumper assembly 80 substantially comprises tubular bumper bar 81, which bar is perpendicular to fin members 225a, and two channel shaped members 82 which are colinear with fin members 225a. Channel shaped members 82 are furnished with slotted holes at their ends to engage studs 225h and with holes to receive pins 225e. Safety latch 225g prevents pin 225e from disengaging.

Bumper assembly 80 can be mounted to fin members 225a by sliding the slotted holes in members 82 over studs 225h and by inserting pin 225e through the holes in members 82 and 225d. All longitudinal forces are transferred from bumper assembly 80 to fin members 225a through pin 225e. Furthermore, longitudinal forces resulting from a rear end collision, for example, would also be transferred from bumper assembly 80 to fin members 225a through studs 225h. Vertical forces applied to bumper assembly 80 are resisted by the fin members through the vertical force couple developed between pin 225e and studs 225h. Lateral forces are resisted by the lateral force couple developed between the sides of channel shaped members 82 and the sides of fins 225a.

Figure 15:
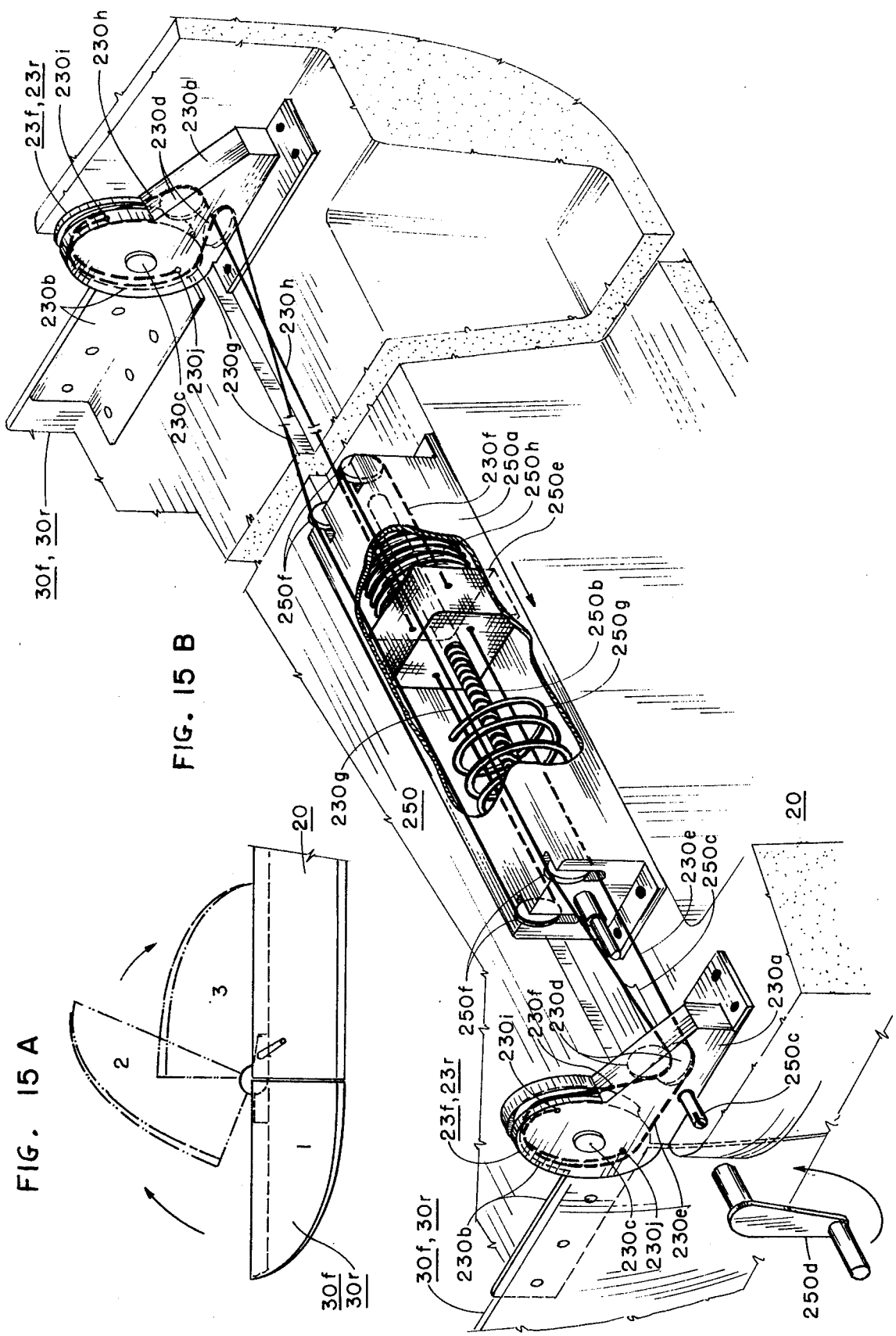

FIG. 15B is a perspective view of means for rotating the end sections relative to center section 20 while FIG. 15A is illustrative of the operation of such means. Each hinge substantially comprises hinge housing 230a which is rigidly mounted to the center sections's top stiffeners, rotating arm 230b which is rigidly mounted to the end sections's top stiffeners at one end and which is rotatably mounted to hinge housing 230a through shaft 230c at the other end. That portion of rotatably arm 230b which is rotatably mounted to housing 230a is circular and incorporates a groove for two actuating cables. Housing 230a further comprises two or more sheaves 230d to guide the cables into associated gear mechanism 250.

Hinge-actuating gear mechanism 250 is fastened to the rectangular vertical end of center section 20 and is mounted inside a tubular housing with end caps 250a. Shaft 250b, which includes a power transmission worm thread, is mounted into housing 250a and supported by associated bearing against the housing end caps. Shaft extension 250c extends from one side of the housing through the side of the top part of camper center section 20 and is furnished with removable crank 250d. The power transmission worm thread of shaft 250b engages the thread in traveling block 250e. By turning crank 250d in the direction indicated, the traveling block moves in the direction indicated. Traveling block 250e is further guided by the walls of tubular housing 250a. Cable guide sheaves 250f are fastened to the ends of the housing. Gear mechanism 250 includes two balancing springs 250g and 250h, which are placed into housing 250a, one on each side of traveling block 250e.

The force transfer from gear mechanism 250 to the hinges is accomplished by means of cables 230e, 230f, 230g and 230h.

One end of each cable 230e and 230g is fastened to respective rotating arms 230b at locations 230i. Cables 230e and 230g wrap around the underside of respective circular grooves, which are part of rotating arms 230b, through an arc in excess of 180°. The other ends of cables 230e and 230g fasten to the near face of traveling block 250e.

One end of each cable 230f and 230h is fastened to respective rotating arms at locations 230j. Cables 230f and 230h wrap around the top side of respective circular grooves, which are part of rotating arms 230b, through an arm in excess of 180°. The other ends of cables 230f fasten to the far face of traveling block 250e.

Each end section is rotated from position 1 through position 2 to position 3 of FIG. 15A as follows:

Crank 250d is rotated as indicated while traveling block 250e moves as indicated. Cables 230f and 230h shorten between the hinges and their respective gear mechanism 250, thereby applying tensile forces through cables 230f and 230h to hinge rotating arms 230b located above shafts 230c and causing the end section to rotate from position 1 to position 2. Since cables 230e and 230g are fastened to the opposite sides of common traveling block 250 from cables 230f and 230h, they lengthen by an equal amount and do not resist the rotation of arms 230b. At position 2, the weight of each end section is entirely over the hinges and the system is balanced. Between positions 2 and 3, tensile forces are induced in cables 230e and 230g and relieved from cables 230f and 230h by the weight of the end sections. During this part of travel, the direction of turning of crank 250d and the direction of travel of block 250e remain as before. However, cables 230e and 230g now resist the gravity rotation of the end sections until the end sections are rotated on top of center section 20. Rotation of the end sections from position 3 to position 1 is accomplished by turning crank 240d in the opposite direction.

Since the weight of the end sections causes high torques at crank 250d, the weight is balanced by springs 250h and 250g as follows:

When the end sections are at position 1, maximum torque is required at the hinges and maximum force is required in cables 230f and 230h to rotate the end sections. When the end sections rotate around the hinges from position 1 to position 2, the torque and corresponding forces vary from maximum to zero. Correspondingly, when the end sections are at position 1, spring 250h is compressed by block 250e to its minimum length thereby developing a maximum force against block 240e. When the end sections rotate from position to position 2, block 250e moves in the direction indicated whereby spring 250h lengthens to cause a correspondingly smaller force to be applied by the springs to block 250e. When the end sections are at position 2, i.e. where their weight is balanced over the hinges, block 250e is near the midpoint of its horizontal travel and does not develop any appreciable force against springs 250h or 250g. When the end sections rotate from position 2 to position 3, the hinge torque changes from zero to maximum. Correspondingly, the force developed by moving block 250e against spring 250g develops a force against the block from zero to maximum, which force varies according to the position of the end sections and the corresponding block 250e position thereby minimizing the forces required for turning crank 250d.

The power transmission worm thread on shaft 250b utilizes a self-locking helix angle. This prevents unbalanced gravity forces applied from the end sections through block 250e to shaft 250b from rotating the shaft and moving the block. Therefore, the crank can be removed during any position of the end sections' rotational travel in which case then end sections maintain their position.

FIG. 16A and FIG. 16B are top and side views, respectively, of means for fixedly attaching tow bar assembly 70 to center section fin members 225a. Tow bar assembly 70 substantially comprises bar 71 and fork assembly 72, both of which are made of tubular steel construction. Tow bar 71 is attached to fork assembly 72 by means of tubular sleeve 73, which is part of fork assembly 72, and removable pin 74. Removable pin 74 is designed to transfer axial loads while tubular sleeve 73 is designed to transfer bending loads from tow bar 71 to form assembly 72. When pin 74 is removed, tow bar assembly 70 can be lengthened by sliding tow bar 71 with respect to fork assembly 72. This is advantageous when it is desired to unfold the end sections relative to center section 20 without disconnecting the tow bar from the tow vehicle, not shown.

Tow bar 71 includes tow hitch connection means 75 mounted at one end thereof and stop ring 76 mounted at the other end to prevent tow bar 71 from disengaging from sleeve 73 when the tow bar is extended. Pin 74 can be inserted through any desired set of holes located on two bar 71 when in the extended position.

Tow bar assembly 70 can be directed connected to fin members 225a by means not shown, or by the use of auxiliary members 225k which can be framed between and above fin members 225a within the floor space. In either case, the physical connection can be made through plates with slotted holes 225m permanently fastened to fin members 225a or to members 225k and plates with pin holes 225 permanently fastened to fin members 225a or to members 225k.

Pins 77, which are permanently connected to fork assembly 72, engage the slotted holes in plate 225m. Removable pins 78 can be inserted through the holes in fork assembly 72 and through the holes in plates 225. All longitudinal loads from tow bar assembly 70 are transferred to fin members 225a through pins 78. Continuity with fins 225a for moment transfer is therefore achieved through the vertical force couple through pins 77 and 78.

While the amphibious camper of the present invention has been described in terms of specific illustrative embodiments, it will be apparent to those skilled in the art that many modifications are possible within the spirit and scope of the disclosed principle.

What is claimed in:

1. In combination, a vehicle structure having a longitudinal axis and a rear end, a base member mounted to the structure adjacent the rear end, an intermediate support member, means pivotably mounting a forward portion of the intermediate support member to the base member for rotation about a horizontal axis transverse to the structure's longitudinal axis between a first position wherein the intermediate support member extends rearward and a second position wherein the intermediate support member extends forward, an engine mounting member, means pivotably mounting a forward portion of the engine mounting member to a rearward portion of the intermediate support member for rotation of the engine mounting member about a horizontal axis parallel to the structure's longitudinal axis over substantially 90°, an engine, means for mounting the engine to a rearward portion of the engine mounting member, and engine weight counterbalancing means connected between the intermediate support member and the base member and providing a force to substantially counterbalance the engine weight during pivoting of the intermediate support member and attached engine mounting means and engine, said intermediate support member and engine mounting means forming a cantilever support for the engine and with the engine outboard and spaced from the structure's rear end when the intermediate support member is in its first position.

2. The combination of claim 1 wherein in the pivotable mountings are such that when the intermediate support member is in its first position the engine is outboard and can be extended vertically, and when the intermediate support member is in its second postion the engine is inboard and can be extended horizontally transverse to the vehicle's longitudinal axis.

3. The combination of claim 2 wherein the pivotable mounting means for the forward portion of the intermediate support member forms a single fixed pivot axis on the base member, the base member is immovably mounted to the structure, and the intermediate support member pivots over an arc of approximately 180°.

4. The combination of claim 3 wherein the counterbalancing means comprises spring means connected between a lower portion of the base member and a portion of the intermediate support member on the side of the fixed pivot axis remote from the engine when the intermediate support member is in its first position, and further comprising means for locking the engine mounting member to the intermediate support member, and means for locking the intermediate support member to the base member.

5. The combination of claim 4 wherein the intermediate support member has a yoke configuration, the base member has spaced upright members connected to the yoke sides, and the engine mounting member comprises a generally rectangular frame connected at one end to the yoke end.

6. The combination of claim 5 wherein the intermediate support member and the engine mounting member are the sole moving parts during pivoting of the engine from an outboard to an inboard position.

7. The combination of claim 5 wherein the pivotable mount of the engine mounting means is located rearward of the structure's rear end when the intermediate support member is in its first position.

* * * * *